(12) United States Patent
Pereira et al.

(10) Patent No.: US 9,646,007 B2
(45) Date of Patent: May 9, 2017

(54) DISTRIBUTED AND TIERED ARCHITECTURE FOR CONTENT SEARCH AND CONTENT MONITORING

(71) Applicant: Gracenote, Inc., Emeryville, CA (US)

(72) Inventors: Jose Pio Pereira, Cupertino, CA (US); Shashank Merchant, Sunnyvale, CA (US); Prashant Ramanathan, Mountain View, CA (US); Sunil Suresh Kulkarni, San Jose, CA (US); Mihailo M. Stojancic, San Jose, CA (US)

(73) Assignee: GRACENOTE, INC., Emeryville, CA (US)

( * ) Notice: Subject to any disclaimer, the term of this patent is extended or adjusted under 35 U.S.C. 154(b) by 0 days.

(21) Appl. No.: 15/163,004

(22) Filed: May 24, 2016

(65) Prior Publication Data

US 2016/0371269 A1    Dec. 22, 2016

Related U.S. Application Data

(62) Division of application No. 14/990,565, filed on Jan. 7, 2016, now Pat. No. 9,436,689, which is a division of application No. 14/589,366, filed on Jan. 5, 2015, now Pat. No. 9,262,421, which is a division of application No. 13/276,110, filed on Oct. 18, 2011, now Pat. No. 8,959,108.

(60) Provisional application No. 61/393,971, filed on Oct. 18, 2010.

(51) Int. Cl.
G06F 17/30    (2006.01)

(52) U.S. Cl.
CPC .... G06F 17/30038 (2013.01); G06F 17/3002 (2013.01); G06F 17/3056 (2013.01); G06F 17/30377 (2013.01)

(58) Field of Classification Search
CPC .......... G06F 17/30029; G06F 17/3038; G06F 17/30038; G06F 17/3002; G06F 21/32
See application file for complete search history.

(56) References Cited

PUBLICATIONS

Shu-Shing Chen et al., "Scene Change Detection Using Audio and Visual Clues", www.citeseerx.ist.psu.edu/viewdoc/download-?doi=10.1.1.8.4119.

*Primary Examiner* — Cheryl Lewis
(74) *Attorney, Agent, or Firm* — Hultquist, PLLC; Peter H. Priest

(57) ABSTRACT

An efficient large scale search system for video and multimedia content using a distributed database and search, and tiered search servers is described. Selected content is stored at the distributed local database and tier1 search server(s). Content matching frequent queries, and frequent unidentified queries are cached at various levels in the search system. Content is classified using feature descriptors and geographical aspects, at feature level and in time segments. Queries not identified at clients and tier1 search server(s) are queried against tier2 or lower search server(s). Search servers use classification and geographical partitioning to reduce search cost. Methods for content tracking and local content searching are executed on clients. The client performs local search, monitoring and/or tracking of the query content with the reference content and local search with a database of reference fingerprints. This shifts the content search workload from central servers to the distributed monitoring clients.

21 Claims, 20 Drawing Sheets

| Timestamp | Signature | Content ID | Feature information | Link to Menu options and Metadata |
|---|---|---|---|---|
| 921 | 922 | 923 | 924 | 925 |

| Menu opt1 | Time Loc | Action |
|---|---|---|
| Menu opt2 | Time Loc | Action |

930

· · · ·

MetaData for Menus is derived from users or curated information. Metadata can be other information about program as well as links to other information sources.

| Menu opt8 | Time Loc | Action |
|---|---|---|
| Menu opt9 | Time Loc | Action |

DISTRIBUTED AND TIERED ARCHITECTURE FOR CONTENT SEARCH AND CONTENT MONITORING

This application claims the benefit of U.S. patent application Ser. No. 14/990,565 filed on Jan. 7, 2016, now U.S. Pat. No. 9,436,689 which is a divisional of and claims the benefit of U.S. patent application Ser. No. 14/589,366 filed on Jan. 5, 2015, now U.S. Pat. No. 9,262,421 which is a divisional of and claims the benefit of U.S. patent application Ser. No. 13/276,110 filed on Oct. 18, 2011, now U.S. Pat. No. 8,959,108 which claims the benefit of U.S. Provisional Patent Application Ser. No. 61/393,971 entitled "Distributed and Tiered Architecture for Content Search and Content Monitoring" filed on Oct. 18, 2010 which are hereby incorporated by reference in their entirety.

CROSS REFERENCE TO RELATED APPLICATIONS

U.S. patent application Ser. No. 12/141,163 filed on Jun. 18, 2008, now U.S. Pat. No. 8,299,227 entitled "Methods and Apparatus for Providing a Scalable Identification of Digital Video Sequences", U.S. patent application Ser. No. 12/141,337 filed on Jun. 18, 2008, now U.S. Pat. No. 8,171,030 entitled "Method and Apparatus for Multi-dimensional Content Search and Video Identification", U.S. patent application Ser. No. 12/772,566 filed on May 3, 2010, now U.S. Pat. No. 8,195,689 entitled "Media Fingerprinting and Identification System", U.S. patent application Ser. No. 12/788,796 filed on May 27, 2010, now U.S. Pat. No. 8,335,786 entitled "Multi-Media Content Identification Using Multi-Level Content Signature Correlation and Fast Similarity Search", U.S. patent application Ser. No. 13/102,479 filed on May 6, 2011, now U.S. Pat. No. 8,655,878 entitled "Scalable, Adaptable, and Manageable System for Multimedia Identification"; U.S. patent application Ser. No. 13/327,359 filed on Dec. 15, 2011 entitled "TV Content Segmentation, Categorization and Identification and Time-Aligned Applications"; U.S. patent application Ser. No. 13/647,996 filed on Oct. 9, 2012 entitled "Audio Content Fingerprinting Based on Two-Dimensional Constant Q-Factor Transform Representation and Robust Audio Identification for Time-Aligned Applications"; U.S. patent application Ser. No. 13/590,701 filed on Aug. 21, 2012 entitled "Media Content Identification on Mobile Devices"; U.S. patent application Ser. No. 13/826,502 filed on Mar. 14, 2013 entitled "Method for Efficient Database Formation and Search on Media Devices Acting Synchronously with Television Programming"; U.S. patent application Ser. No. 14/151,294 filed on Jan. 9, 2014, now U.S. Pat. No. 8,965,863 entitled "Scalable, Adaptable, and Manageable System for Multimedia Identification"; U.S. patent application Ser. No. 14/151,335 filed on Jan. 9, 2014, now U.S. Pat. No. 9,058,355 entitled "Scalable, Adaptable and Manageable System for Multimedia Identification"; and U.S. patent application Ser. No. 14/255,742 filed on Apr. 17, 2014 entitled "Systems and Methods to Associate Multimedia Tags with User Comments and Generate User Modifiable Snippets Around a Tag Time for Efficient Storage and Sharing of Tagged Items" have the same assignee as the present application, are related applications and are hereby incorporated by reference in their entirety.

FIELD OF THE INVENTION

The present invention generally relates to information retrieval in distributed multimedia data base systems.

BACKGROUND OF THE INVENTION

Media applications which include video and audio database management, database browsing and identification are undergoing explosive growth and are expected to continue to grow. To address this growth, there is a need for a comprehensive solution related to the problem of creating a multimedia sequence database and identifying, within such a database, a particular multimedia sequence or sequences that match the content that is played out with or without media content distortions. Applications for such a comprehensive solution include video database mining, copyright content detection for video hosting web-sites, contextual advertising placement, and broadcast monitoring of video programming and advertisements.

There is a need for scalable search systems for large scale multi-media content identification and monitoring. Television channel organizations, advertising agencies, and other commercial and personal interests desire a system and method for monitoring and searching of broadcast television shows, films, and commercials and online broadcast of various cable and internet networks programming. Another application is monitoring and gathering statistics for large audiences viewing of various media on TVs, computers, and portable devices. Other popular applications of a content search and monitoring system are related to improving user experiences, enabling social communication, and various forms of advertising. To provide such applications, content to be identified or monitored is compared to content stored in one or more large databases of videos and media content. This represents a massive database search and correlation problem. To be of value the search systems should support real time database searching, monitoring, and updating. The sophistication, flexibility, and performance that are desired exceed the capabilities of current generations of software based solutions, in many cases, by an order of magnitude.

SUMMARY OF THE INVENTION

In one or more of its several aspects, the present invention recognizes and addresses problems such as those described above. To such ends, an embodiment of the invention addresses a method for content monitoring. Fingerprints are generated in a user device for user watched content that includes popular and real time live content. The user watched content is searched for in a reference database. A menu of option is generated based on a reference database content that matched with the user watched content. The menu of options is displayed on the user device to solicit user selection of one displayed option.

Another embodiment of the invention addresses a method of performing search and video tracking. Content of a query generated on a user device is classified to generate a classified query. The classified query is compared with classified reference contents stored in a local cached database on the user device. A menu of option is generated based on a reference database content that matched from a search with the query. The menu of options is displayed on the user device to solicit user selection of one displayed option.

Another embodiment of the invention addresses a method for fast updating of a search database. Signatures of a real time database update are stored in sequential order as received in a buffer on a user device. The signatures are sent from the user device to a remote database without locks. A remote database is updated with the signatures of the real time update.

Another embodiment of the invention addresses a method for fast updating of a search database. Two duplicate databases are created using an initial set of reference signatures. A first database of the two duplicate databases is searched as the active database. A second database of the two duplicate databases as the standby database is updated with new signatures for new content to be added to the search database. The standby database is switched with the active database to create a new standby database. The new standby database is updated with the new signatures for the new content.

Another embodiment of the invention addresses a method of publishing content for viewing on remote client devices. Metadata that includes menu options with links to control viewing of content on a remote client device is created on a server. The metadata is distributed to the remote client device which overlays the menu options on a viewing screen of the remote client device in response to selected metadata. The content is published in response to a selection of an option from the menu options.

These and other features, aspects, techniques and advantages of the present invention will be apparent to those skilled in the art from the following detailed description, taken together with the accompanying drawings and claims.

BRIEF DESCRIPTION OF DRAWINGS

FIG. 9B illustrates a signature data structure for use in remote synchronized applications in accordance with the present invention; and FIG. 9C illustrates an exemplary menu data structure suitable for use in a metadata based data structure for remote synchronized applications in accordance with the present invention.

DETAILED DESCRIPTION

Figure 1A:
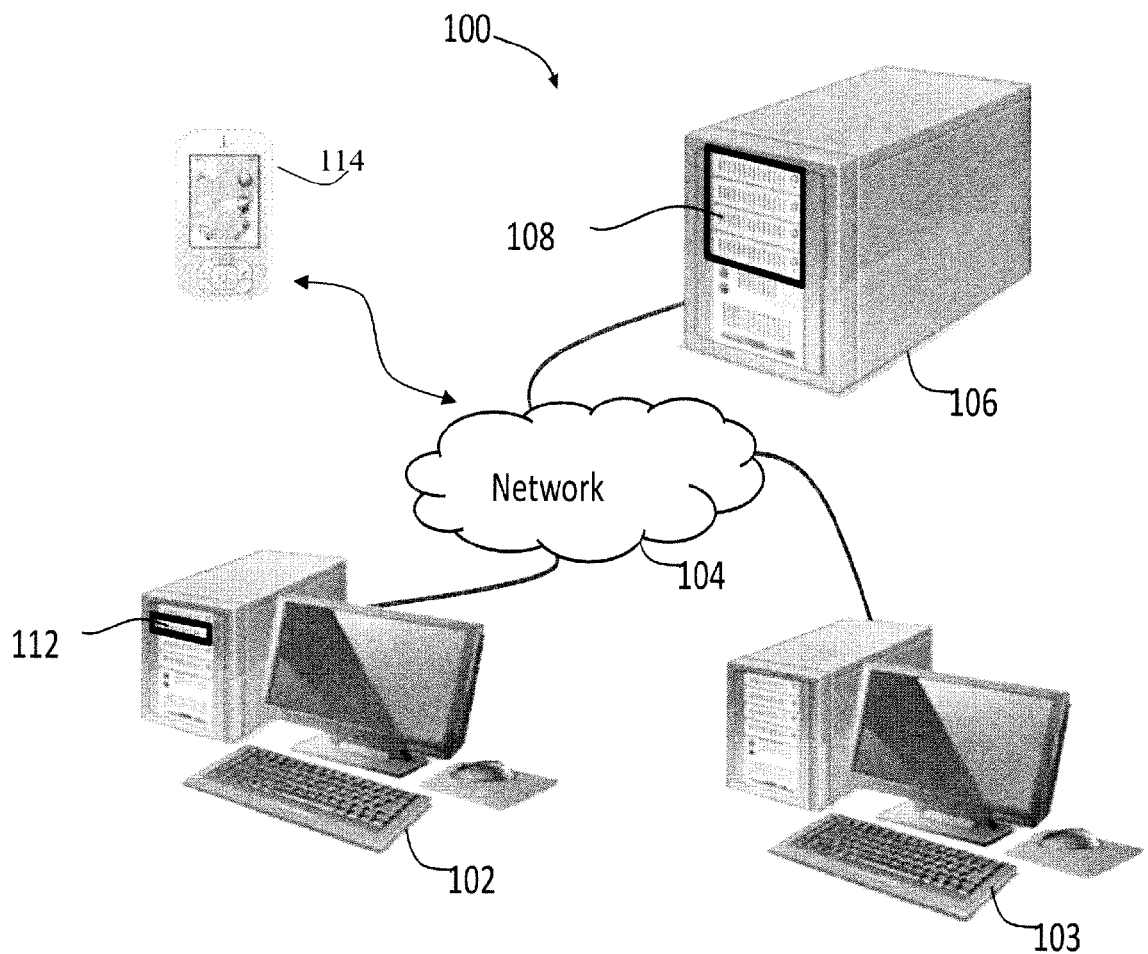
FIG. 1A illustrates a fingerprinting and search system for media content monitoring and searching in accordance with the present invention.

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer readable storage medium having non-transitory computer usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Python, Ruby, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module executed by a processor, or in a combination of the two. A software module may reside as non-transitory signals in RAM memory, flash memory, ROM memory, EPROM memory, EEPROM memory, registers, hard disk, a removable disk, a CD-ROM, or any other form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor.

Systems and methods are described that are highly scalable to very large multimedia databases. A reference multimedia database can be modified by adding a unit of multimedia content or removing an existing unit of multimedia content while it is being used for multimedia identification. A unit of multimedia content may be a frame or a sequence of frames of a video, an audio clip, other multimedia formatted data, such as frames from a movie. A unit of multimedia content may also be a television show without advertisements, an advertisement, a song, or similar unit of communication. The search system can be tuned to the desired speed of multimedia matching by centralized and distributed systems, by replication of individual search machines or search machine clusters, by use of a hierarchical tier of search machines and reference databases, by partitioning of reference databases, by multimedia query caching, by local client search methods, by client tracking, or by combinations of the previously mentioned arrangements. As an example, the search system can be implemented in a centralized client server model, or as a distributed system, or by a combination of such approaches. Also, a distributed search system may be operable on a variety of distributed networks, such as a peer to peer (P2P) system. In addition, search functions or a complete search operation may be operable at the client.

The following nomenclature is used in describing the present invention. For example, multimedia content represents any video, audio or audio-visual content. Multimedia content may also represent a series of photographs or pictures, a series of audio files, or other associated data, such as 3D video content or 4D content in which sensory feedbacks such as touch feedback sensations are presented simultaneously with visual and audio content.

The terms signature and fingerprint both denote the same structure of a sequence of bits and may be used interchangeably. A fingerprint is generated to represent a unit of multimedia content using a fingerprinting method that operates on the unit of multimedia content. A descriptor denotes a bit structure that is an arrays of bits or an array numbers or a single number, and the descriptor is, in effect a digital description of a feature or property of audio or video content at a particular time. A signature, also known as a fingerprint, is generated from a descriptor. A cluster key is a type of hash key. A cluster index is a data structure that holds the signatures that have the same cluster key. A multimedia signature index is a data structure that is used to hold signatures associated with a unit of multimedia content.

A number of exemplary goals of a multimedia identification system include an ability to handle large capacity multimedia databases and high density media files. The multimedia identification system is to provide high performance and respond with accurate media identification when queried. Also, the overall design should be scalable to efficiently handle increasing capacity of the multimedia databases and an arbitrary length of a query sequence.

A number of embodiments the present invention include a system for large scale video identification and monitoring. The system consists of fingerprint clients and/or a tiered search system and a database of signatures representing the media content or object content. During a query with content from user viewed video, a series of steps of classification, database searching, and correlation are performed to identify the matching content at the central search servers or within the cached database.

For content identification and classification, content features need to be extracted. For video content, image and video features can be detected using various approaches such as key point detection across a set of filter scales, or using segmentation and contours to identify an object. Alternatively a combination of algorithms may be used including motion segmentation and the above methods to provide highly accurate feature and object detection. Signatures or video activity classification can be derived from detected motion between frames of a video sequence. Features of interest include color descriptors, texture descriptors, image classifiers, activity descriptors, face detectors and descriptors. Audio descriptors can include onset location, peaks or strongest coefficients of log-frequency cepstral coefficients (LFCC) or mel-frequency cepstral coefficients (MFCC) and the strongest frequency bands, and changes in audio envelope. Other content features that can be detected are audio events, audio phonemes, text in images using optical character recognition (OCR), or speech to text conversion.

The application of classifiers to the search system can improve search performance and capacity by orders of magnitude. The classification descriptors can be used to reduce the search space of each signature. A few methods on classifying content and using classification to separate databases are described and the result in significant cost benefits in various use cases of where millions of clients are supported.

Another method to optimize the search system is to use distributed search at the remote clients. A selected subsets of reference databases in the distributed search system can be stored locally at each client device and updated at planned intervals or, for example, in response to querying a central search system. After a query content is identified, further tracking and new content identification can be continued on the remote client thereby avoiding queries to the central search system. With this system it is also possible to query locally first and send a query to central server only if no content is found on local server.

Another method to optimize the search system is to organize the search in multiple tiers with the most frequent or likely content placed in the first search tier. If there is no match found, then search can be performed in the next search tiers that store less popular content. As a further improvement, classification can be used to reduce the search cost in the tier 2 or higher search levels, or at any search level included the distributed search system on clients. Tiered search is used to reduce search cost. If a first search reaches a small database with a high likelihood of finding a match, a search into the next tier possibly having 100's of servers is avoided where the probability of finding a match is only incrementally better. The tiered structure also advantageously addresses update and maintenance requirements. Real time updates are typically confined to early tiers and high performance servers. In most configurations described herein, the real time updates are performed on servers with smaller databases allowing updates and maintenance to be performed efficiently and with fewer memory management restrictions.

Another method addresses caching of popular and may include caching of expected content. The method also supports caching of popular unknown content to reduce search cost. Content that has been searched and not found at any tier of a search system may be considered as unknown content and marked as unidentified and cached in an unidentified query cache. The unknown or unidentified content may be identified at a later time by searching the unidentified query cache with new sources of popular content or even by human observation.

To provide for such needs, FIG. 1A illustrates a fingerprinting and search system 100 for both media fingerprinting and identification in accordance with an embodiment of the present invention. The fingerprinting and search system 100 includes user sites 102 and 103, a server 106, a video database 108, a remote user device 114 with a wireless connection to the server 106 and for example to a video fingerprinting and video identification process 112 operated, for example, by user site 102. The remote user device 114 is representative a plurality of remote user devices which may operate as described in accordance with embodiments of the present invention. A network 104, such as the Internet, a wireless network, or a private network, connects sites 102 and 103 and server 106. Each of the user sites, 102 and 103, remote user device 114, and server 106 may include a processor complex having one or more processors, having internal program storage and local user controls such as a monitor, a keyboard, a mouse, a printer, and may include other input or output devices, such as an external file storage device and communication interfaces.

The user site 102 may comprise, for example, a personal computer, a laptop computer, a tablet computer, or the like equipped with programs and interfaces to support data input and output and video fingerprinting and search monitoring that may be implemented both automatically and manually. The user site 102, for example, may store programs, such as the video fingerprinting and search process 112 which is an implementation of a content based video identification process of the present invention. The user site 102 may also have access to such programs through electronic media, such as may be downloaded over the Internet from an external server, accessed through a universal serial bus (USB) port from flash memory, accessed from disk media of various types, or the like. The fingerprinting and search system 100 may also suitably include more servers and user sites than shown in FIG. 1A. Also, multiple user sites each operating an instantiated copy or version of the video fingerprinting and search process 112 may be connected directly to the server 106 while other user sites may be indirectly connected to it over the network 104.

User sites 102 and 103 and remote user device 114 may generate user video content which is uploaded over the Internet 104 to a server 106 for storage in the video database 108. The user sites 102 and 103 and remote user device 114, for example, may also operate a video fingerprinting and video identification process 112 to generate fingerprints and search for video content in the video database 108. The video fingerprinting and video identification process 112 in FIG. 1A is scalable and utilizes highly accurate video fingerprinting and identification technology as described in more detail below. The process 112 is operable to check unknown video content against a database of previously fingerprinted video content, which is considered an accurate or "golden" database. The video fingerprinting and video identification process 112 is different in a number of aspects from commonly deployed processes. For example, the process 112 extracts features from the video itself rather than modifying the video. The video fingerprinting and video identification process 112 allows the server 106 to configure a "golden" database specific to its business requirements. For example, general multimedia content may be filtered according to a set of guidelines for acceptable multimedia content that may be stored on the business system. The user site 102, that is configured to connect with the network 104, uses the video fingerprinting and search process 112 to compare local video streams against a previously generated database of signatures in the video database 108.

The video database 108 may store video archives, as well as data related to video content stored in the video database 108. The video database 108 also may store a plurality of video fingerprints that have been adapted for use as described herein and in accordance with the present invention. It is noted that depending on the size of an installation, the functions of the video fingerprinting and search process 112 and the management of the video database 108 may be combined in a single processor system, such as user site 102 or server 106, and may operate as directed by separate program threads for each function.

The fingerprinting and search system 100 for both media fingerprinting and identification is readily scalable to very large multimedia databases, has high accuracy in finding a correct clip, has a low probability of misidentifying a wrong clip, and is robust to many types of distortion. The fingerprinting and search system 100 uses one or more fingerprints for a unit of multimedia content that are composed of a number of compact signatures, including cluster keys and associated metadata. The compact signatures and cluster keys are constructed to be easily searchable when scaling to a large database of multimedia fingerprints. The multimedia content is also represented by many signatures that relate to various aspects of the multimedia content that are relatively independent from each other. Such an approach allows the system to be robust to distortion of the multimedia content even when only small portions of the multimedia content are available.

Multimedia, specifically audio and video content, may undergo several different types of distortions. For instance, audio distortions may include re-encoding to different sample rates, rerecording to a different audio quality, introduction of noise and filtering of specific audio frequencies or the like. Sensing audio from the ambient environment allows interference from other sources such as people's voices, playback devices, and ambient noise and sources to be received. Video distortions may include cropping, stretching, re-encoding to a lower quality, using image overlays, or the like. While these distortions change the digital representation, the multimedia is perceptually similar to undistorted content to a human listener or viewer. Robustness to these distortions refers to a property that content that is perceptually similar will generate fingerprints that have a small distance according to some distance metric, such as Hamming distance for bit based signatures. Also, content that is perceptually distinct from other content will generate fingerprints that have a large distance, according to the same distance metric. A search for perceptually similar content, hence, is transformed to a problem of searching for fingerprints that are a small distance away from the desired fingerprints. Embodiments of this invention address accurate classification of queries. By accurately classifying query content, a classified query can be correctly directed to relevant search servers and avoid a large search operation that generally would involve a majority of database servers.

Further embodiments of this invention address systems and methods for accurate content identification. As addressed in more detail below, searching, content monitoring, and content tracking applications may be distributed to literally million of remote devices, such as tablets, laptops, smart phones, and the like. Content monitoring comprises continuous identification of content on one or more channels or sources. Content tracking comprises continued identification of already identified content without performing search on the entire database. For example, a television program may be identified by comparing a queried content with content already identified, such as television programs and primarily with the anticipated time location of the program. Also, when a query is sent to a search server, prior matching information that is known and associated with the query is also sent along with the query. Thus, the search server knows previous match time and can extrapolate to predict the likely reference time. If the server has additional information to modify the predicted time, for example to subtract time for an advertisement insertion, this is performed at the tracking function. A time line indicates predicted points in time. For example, if a match is made with a reference time 0:01:00 in a video clip, for example, to a remotely viewed content at time 10:00:00, then at time 10:02:00 in the remotely viewed content a match would be expected at 0:03:00 in the reference content in normal circumstances. In case an advertisement is to be inserted in the remotely viewed content, three possible approaches may be used. In a first approach, advertisements are detected and analyzed for duration in order to avoid searching for the same advertisements. In a second approach, by knowing the exact time of a shift in content to an advertisement, a query is performed at the predicted time and a different advertisement clip may be inserted in the remotely viewed content with adjustments made if there are differences in duration. In a third approach, by knowing the range of expected reference time to be within the 0:01:00 to 0:03:00, a search operation on the reference can be limited to the time range 0:01:00 to 0:03:00. This is in contrast to a number of current approaches that involve a large number of database servers for such applications.

Figure 1B:
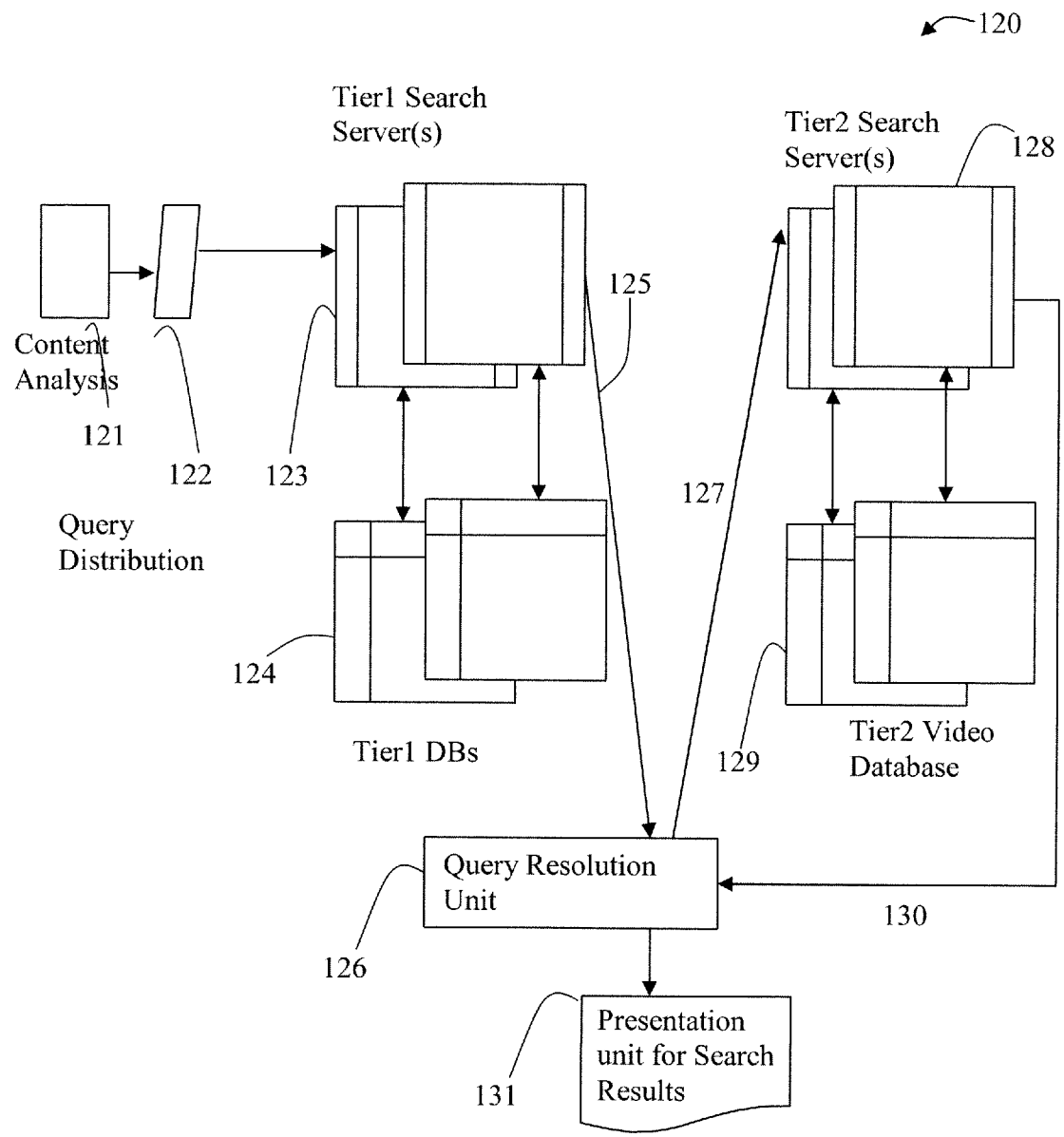
FIG. 1B illustrates a tiered system with multiple servers at each tier of the search system server(s) in accordance with the present invention.

FIG. 1B illustrates a tiered system 120 with multiple servers at each tier of the search system server(s) in accordance with the present invention. The tiered system 120 is used to reduce search cost for a large scale content monitoring and identification system. The tiered system 120 includes a content analysis function 121 which generates a content query 122 that is entered in the tiered system 120 having tier 1 search servers 123 and tier 2 search servers 128. Each tier 1 and tier 2 search server comprises a tier 1 database (DB) 124 and a tier 2 DB 129, respectively. The tiered system 120 further includes a query resolution unit 126 and a presentation unit 131 for presentation of final results. The most likely content is placed in the tier 1 DB 124 with fewer servers and a smaller database. Likely content is identified by statistical methods or as identified by an operator. The likely content includes popular live broadcast programs and popular content such as recent TV shows, movies, and the like. Thus, most of the queries are identified by this small set of tier 1 search servers 123, avoiding search for the most likely content in the much larger tier 2 search servers 128 and DB 129 and thus reducing search cost. If the content is not found in the initial tier 1 search, the query is distributed or selectively sent to the tier 2 search servers 128. Additional tiers can be used and each tier can have a plurality of servers, and the number of servers is based on the size of database and search performance required. The tiered search system 120 uses various selection methods to select content for tier1. A content query, 122 is first applied to tier1 search server 123 which performs search on its content database 124. The result of the query in the tier 1 DB 124 is presented on path 125 to the query resolution unit 126. The query resolution unit 126 which often resides in a cluster node that aggregates results from a set of search servers, generates a final search result for presentation on the presentation unit 131. If no match was found in the query search in the tier 1 DB 124, the query resolution unit 126 applies the query, on path 127 to the next search tier, tier 2 search server 128. The results of tier2 search are sent over path 130 to the query resolution unit 126, and final results are presented on the presentation unit 131.

Figure 2A:
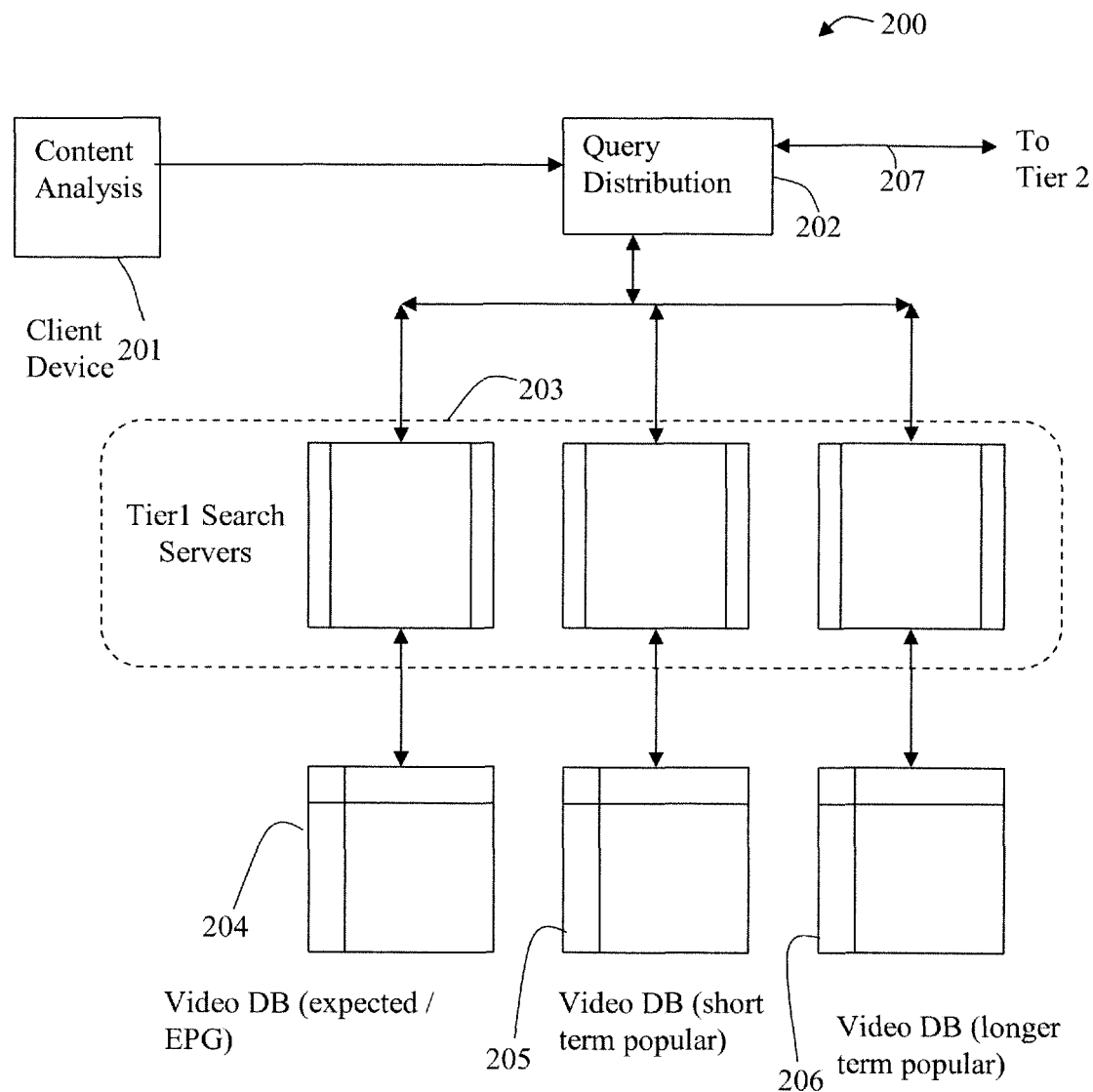
FIG. 2A illustrates a distributed client tiered system that makes use of multiple methods for selecting content for Tier1 Search Servers for video search in accordance with the present invention.

FIG. 2A illustrates a distributed client tiered system 200 that makes use of multiple methods for selecting content for Tier1 Search Servers for video search in accordance with the present invention. Content analysis including fingerprinting is performed in client device 201. The distributed client tiered system 200 provides remote clients the ability to identify content and receive applications that are delivered by content owners related to the identified content. Remote client application can be embedded in client devices, such as home televisions, set top boxes, buddy boxes, smartphones, tablets, laptops, and other portable and desktop computer systems. The capacity of the search database associated with remote client application located on each of the client devices may vary as permitted by its compute and memory resources. Thus, the remote client application and the distributed client tiered system 200 is adaptable to the resources available on the plurality of remote devices, such as client device 201. The system 200 is designed to allow various distributions of the search computations at the client devices and at the centralized servers, which may use a multiple tiered system as described with FIG. 1B. The U.S. patent application Ser. No. 12/141,337 filed on Jun. 18, 2008 entitled "Method and Apparatus for Multi-dimensional Content Search and Video Identification" discusses some methods of fingerprinting that may be used on the plurality of client devices, such as client device 201.

In another embodiment, multiple selection methods are used to select content for tier1 search server(s), and for the next tier of search server(s). The content selection methods include selections made on temporal periods, such as a day of the week and or time of day, for example, geographical location, such as state, city, or street, for example, and also may be based on a calculated value of the content, such as, most popular televised content during Sunday afternoon. Temporal selection includes real time expected content, such as current broadcast content, short term popular content, such as shows broadcast within a day or days; and longer term popular content from movies, and previously recorded shows. Temporal selection may also include content that matches more frequently among recent queries and can also include frequent queries that do not match content in databases. Temporally selected content can vary as per the "interests" of the day, and in a tiered system reference content signatures can be moved or copied from lower search server(s) to the higher search server(s).

Content may also be partitioned as per the geographical distribution based on audience data and source of content. Similarly, for every user, geographical content of interest can be identified and this data can be used to reduce search cost on a tiered system having a large number of search servers especially at the lower search tiers. Content having a high calculated value can use less selective partitioning for queries and hence can be placed into a tier1 database which may use no partitioning or less selective partitioning.

The output of content analysis in the form of fingerprints is sent as a content query to a query distribution unit 202 of the search system. The tier 1 search servers 203, uses an expected broadcast content database 204, a popular short term content database 205, and a longer term popular content database 206. Expected content refers to the relationship of queries to content in DB. Based on statistics, 80% people watch live television, for example as selected from an electronic program guide (EPG) and this forms the "expected content" that is stored in database 204. In summary, the expected broadcast content database 204 includes selected real time broadcast content. The "popular short term content" database 205, illustrates the selection of most popular programs viewed in the recent day(s) for tier1 search. Short term content typically refers to content that is viral or popular within the last 24 hours. The database 205 stores popular short term content as identified by statistics engine in the search system. Popular media programs, viral content and the like are stored in the database 205. The longer term popular content stored in database 206, represent content that is popular in the recent weeks or a longer time frame and includes popular movies. For example, the database 206 stores longer term popular content that is steadily watched by people such as movies or certain shows. It appreciated that there may be some overlap between these groupings. Above all these groupings, the query distribution unit 202 exists to make it easier to decide how to optimize the search cost by distributing the content. The query distribution unit 202 is configurable to separate and distribute content in the tiered system in an efficient and organized manner. If no match is found at this tier, the query is sent to the next tier, at step 202 on path 207. The main goal tiered system 200 is to distribute content in such a way as to reduce search cost without reducing accuracy.

In another embodiment, content from tier2 can be selected to be moved to tier1, and vice-versa. This decision to move content can be based on updated measures of the popularity of the content at the given search servers.

Figure 2B:
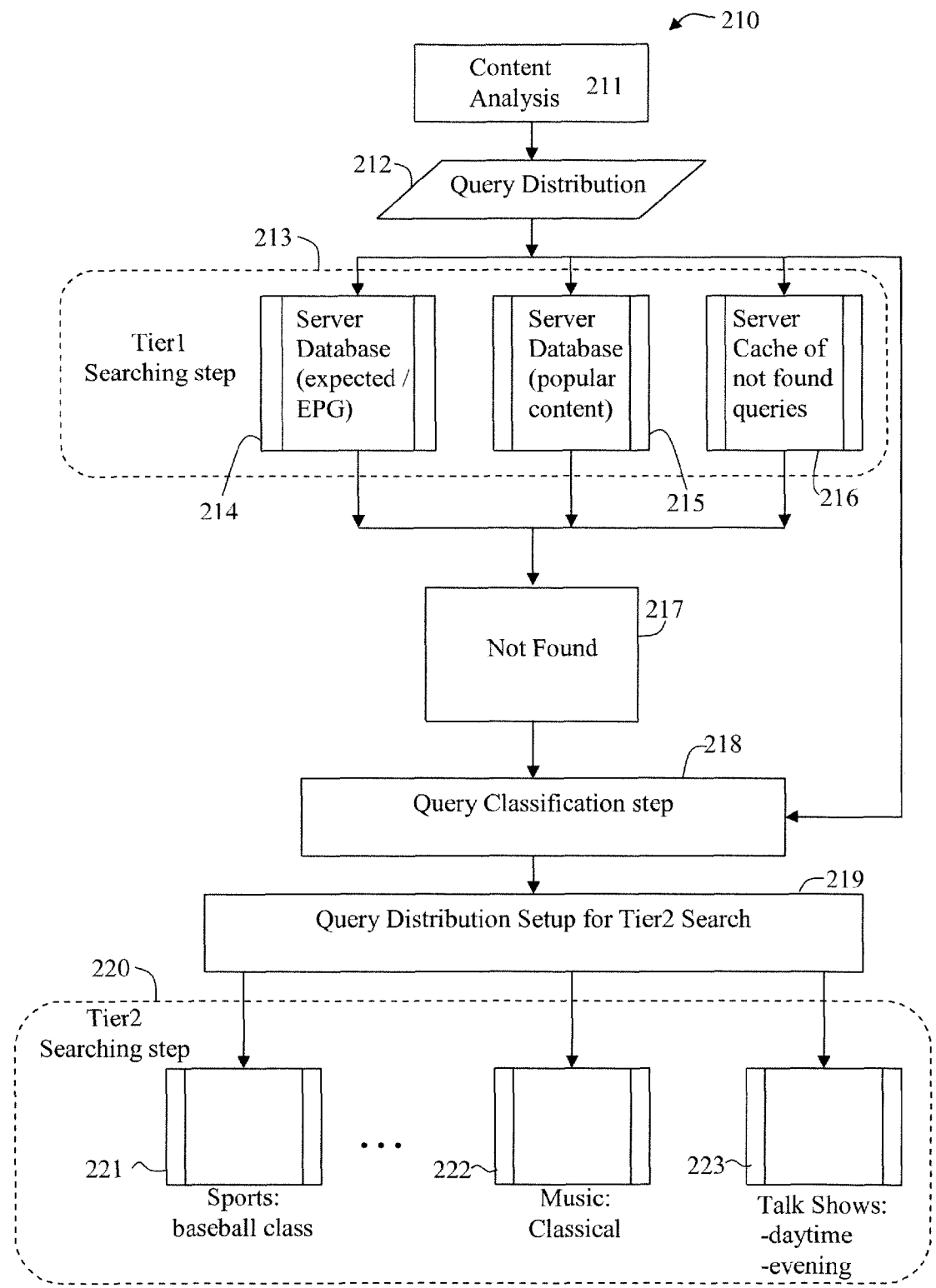
FIG. 2B illustrates a classification process of long tail video signatures for large scale video search in accordance with the present invention.

FIG. 2B illustrates a classification process 210 of long tail video signatures for large scale video search in accordance with the present invention. One embodiment is based on the application of classifiers to the search system to improve search performance and capacity by orders of magnitude over a standard search system for large databases that did not use classification. The classification descriptors can be used to reduce the search space of each signature. The search space reduction can be applied at any of tiered search levels. In another embodiment, search space reduction is achieved by translating classification information into an encoded bit form. The encoded bit representation of the classification information is used to speed up search operations, by utilizing these encoded bit representations as index lookup addresses for quick access to both query and reference information, for example. These encoded bit representations are a compact form of information useful for a targeted search in particular databases. This method relies on further sub-dividing the database for first search step by using the classification bits in the index.

Figure 2C:
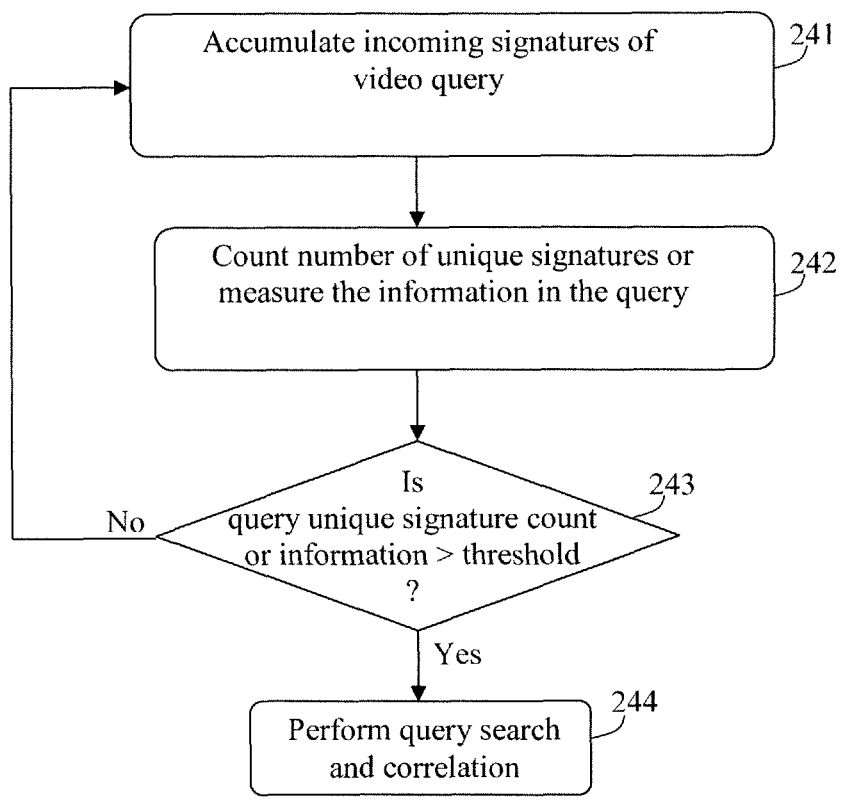
FIG. 2C illustrates a process to perform query selection and optimization in accordance with the present invention.

In another embodiment, classification of queried content is used to reduce search workload and may also be used to expand information storage in a reduced capacity database in case of local search on clients. In this method, classification data, which includes signatures of popular content and extracts of content, are stored at the client nodes. When a close match is found for any content, more details of the content may be downloaded to the client and detailed content monitoring may then be performed at the client. The size of a content identification database can easily include millions of hours of content in a system having a plurality of servers and a composite very large database to be searched, resulting in a large search cost that can increase significantly as more content is added. It is more efficient to classify the content of a query and deliver the query to the most likely databases so as to avoid searching the entire database content. FIG. 2B illustrates a process that uses tiered search and classification of long tail video signatures to reduce search costs. A long tail signature is a signature which reaches the leaf nodes of a tiered system and in a well organized tiered database, the long tail signatures occur with less frequency compared to the majority of search query signatures. Multiple methods are used to select content for searching at tier 1 searching step 213 tier1 search servers 214-216. The search servers host the specified DBs. Content analysis including fingerprinting is performed at step 211 to generate a query which may include a class or feature descriptors of the query and a user profile. The query class pertains to classification description generated by remote client. For example, a classification description may include program type such as sitcoms, sports game "baseball", program source, for example local and national news programs and the like. An advantageous use of classification is to be able to identify with high accuracy a likely matching database, while targeting the query to a small section of the identified database. The user profile refers to typical user behavior and likely viewing statistics. For example, a typical user profile may include a listing of identified popular programs watched and at what time. The creation of the user profile can also separate out which programs are watched one after the other, roughly predicting what different individuals may watch, and at what time. The viewing statistics may include actual statistics of viewing such as which programs watched at what times, and what are the programs watched one after the other. The viewing statistics are used to described user behavior and create user profile. The step 211 can also include query analysis and query optimization as illustrated in FIG. 2C and described in further detail below.

In FIG. 2B, a query distribution step 212 sends the query to be searched at tier 1 searching step 213 in one or more of the servers 214-216. The tier 1 searching step 213 may be directed to access server 214's database which includes selected or expected real time broadcast content. The tier 1 searching step 213 may be directed to access server 215's database which includes popular content. The server 216's content database includes "not found queries", which is a destination database for most frequent "not found queries". The query resolution step 217 evaluates the results from tier1 servers 214-216 and then decides whether to send a query to one or more tier2 servers. The classification step 218 performs a final classification of the query using attached query class descriptors, and the attached user profile sent by step 211. The classification descriptors indicate major classification aspects which may include content source, major performers, content type, speed of action, nature of audio, such as silent, speech, sound effects and the like. The classification step 218 determines likely databases, so that the query can be sent only to the likely search servers that hold the relevant databases to be searched for the query.

For example, the classification step 218 uses attached descriptors of the query class and compares them with the class descriptors of each search database to determine a list of search databases that are close to the query class. The classification step 218 identifies the search servers that are similar to the query. This classification is advantageous and is used to determine to which specific search servers the query is delivered thus improving search performance. Query distribution step 219 receives the matching list of search databases and limits the search to one or more specific servers. Alternately, the classification of query content and signatures can be modified by additional cluster hash index bits and then used in a similarity search step for each query signature. The search space reduction resulting from the query distribution step 219 reduces the search space for each similarity search per query. The U.S. patent application Ser. No. 12/141,337 filed on Jun. 18, 2008 entitled "Method and Apparatus for Multi-dimensional Content Search and Video Identification" included herein in its entirety, describes content search methods using search space reduction. The tier 2 searching step 220 may be directed to access server databases 221-223. The database 221 stores, for example, classified videos based on baseball class descriptors. The database 222 stores, for example, classified videos based on classical music class descriptors. The database 223 stores, for example, classified videos based on talk show class descriptors.

The multi-media content could be classified in many ways including classification based on channel logos for television content or studios in case of movies. Other classifications can be based on learned or designated classes and may use various feature descriptors to represent each class. An example of a classification steps at the client is described and illustrated in FIG. 7.

In another embodiment, classification can be used at every search level including client device search operations and each tier's search operations. A method of content analysis, fingerprinting and querying includes the following steps:

a) analyzing content to extract content features and use the extracted features to classify signatures and the content itself;

b) generating fingerprints for content; and c) checking the fingerprint before issuing a query to the search system. If information content in the query fingerprint is low than probability of a match may also be low, the query check function looks for additional signatures that meets the information content requirement within a predetermined time limit or send the best fingerprint sample found. Latency and response requirements of a system may be used or estimated to specify the predetermined time limit for a query and search response operation.

FIG. 2C illustrates a process 240 to perform query selection and optimization in accordance with the present invention. The process 240 checks if the information content in the query is sufficient to produce an effective query. In addition, optimization could be done to the query to remove redundant content and signatures that tend to be repeated. The query video's signatures are accumulated in step 241 until sufficient query information is determined to be available to perform a search request. For example, unique signatures, those signatures that are separated from other signatures by a minimum distance, are counted. If the count of the total number of unique signatures during a specified period exceeds a threshold, it is determined that sufficient query information exists. At step 242, the number of query signatures or unique signatures are counted or the information content of the query is measured. The information content of a query may be determined by an entropy based information measurement on the query content. At step 243, a decision is made if enough query information is available by thresholding the count or the information entropy measurement, for example. By performing this thresholding check at step 243, a very high chance of query identification is assured and this in turn reduces search costs as well as reduces delay in identification. If a threshold is exceeded, then a search request are initiated at step 244. If the query information is equal to or less than the threshold then more query signatures are collected till sufficient unique signatures are available.

As discussed above, a cluster key is a type of hash key. A cluster index is a data structure that holds the signatures that have the same cluster key. A multimedia signature index is a data structure that is used to hold signatures associated with a unit of multimedia content. Generally, every signature is associated with a cluster key, which is also considered a hash key. Using such a cluster key, a cluster index may be created which is a hash index. The cluster index is a hash data structure where the signatures are stored at a location according the cluster key. The signatures may be stored in a flat array, in a linked list, or in some other data structure.

Figure 2D:
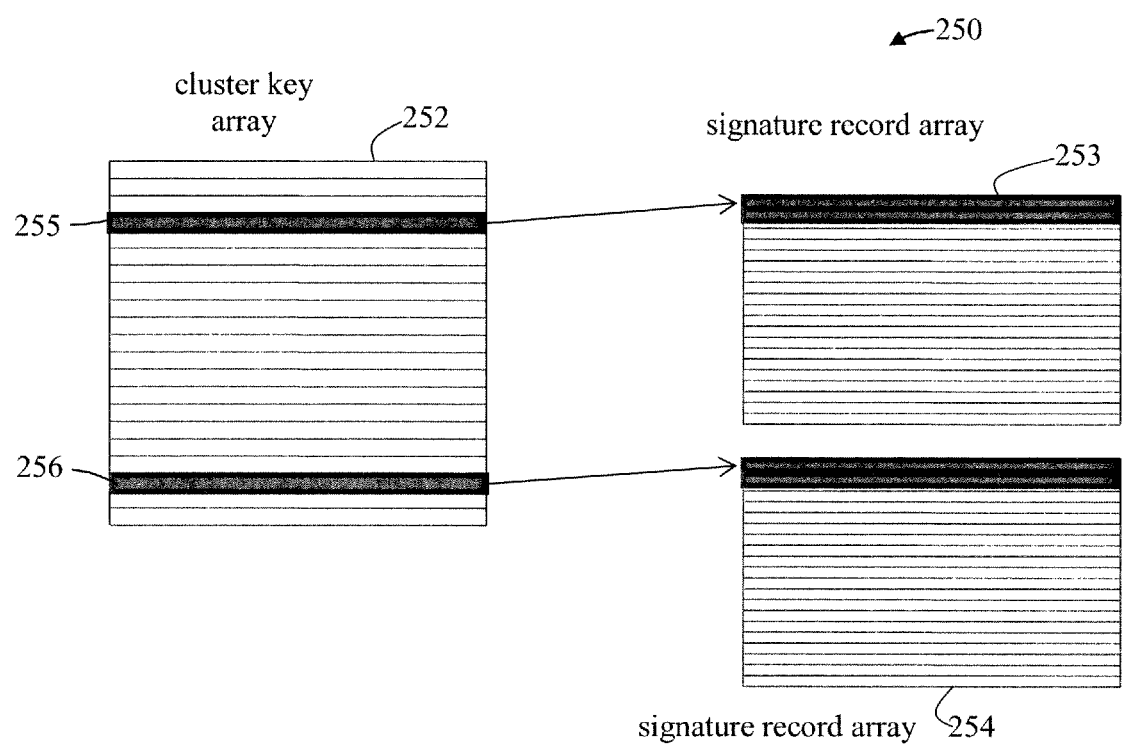
FIG. 2D illustrates an exemplary signature database organized by a cluster key index in accordance with the present invention.

FIG. 2D illustrates an exemplary signature database 250 organized by a cluster key index in accordance with the present invention. The signature records for the multimedia content that are to be placed into the signature database 250 are collected together and grouped by a cluster key. At this stage of processing, the number of signatures that belong to particular cluster key is known so the memory space for the signature records can be allocated and the signature records may be stored in the memory. For example, a cluster key array 252 stores one element for each possible cluster key. The index into the cluster key array 252 is the integer interpretation of the cluster key as a binary number. Thus, given a cluster key, direct addressing into the array 252 retrieves the number of matching signatures and where corresponding signature records are located, such as a link reference address (LRA) to a list of signature records in signature record arrays 253 or 254. In FIG. 2D, for example, cluster key 255 links to the array of signature records 253, and cluster key 256 links to the array of signature records 254. Each entry in cluster key array 252, such as entries 255 and 256, have an additional field included in the entry that stores the link reference address (LRA) to a signature record array, such as signature record 253 and 254. The signature records stored in the memory 253 and 254 are not considered fixed and unchangeable and dynamic updates to the signature records may added as described in more detail below.

When new video content is added to a search database, existing cluster indexes need to be updated with the new video content's signatures by placing the new signatures at appropriate locations in signature record arrays indicated by the cluster keys associated with these signatures. When updating video content that is currently being broadcasted, such as real time live content, the search database needs to be updated continuously. U.S. patent application Ser. No. 13/102,479 titled "Scalable, Adaptable, and Manageable System for Multimedia Identification" filed 6 May 2011 describes these updates as real-time updates. In a tiered search database, the first tier, where the real time live content would most likely reside, receives most of the query load. Hence, the first tier generally needs to be designed to perform fast updates. In the U.S. patent application Ser. No. 13/102,479, methods are described to carry out such updates using exclusive locks around the cluster index data structures. In another embodiment, a method is described herein that does not involve locks for such updates of the cluster index data structures.

The methods below can be used in concert with an existing database which may not be modified by real time updates. For example, fast updates can be performed on a separate database of indexes which does not disturb content in the existing database such as popular content but not necessarily live.

For cluster updates in a live content database, a maximum number of signatures for each cluster key is calculated and based on this calculation, space for the signatures associated with the cluster keys is pre-allocated. This maximum size can be determined by various means. For example, by design requirements and constraints, the total number of content viewing hours supported by the first tier is known. Using a measured number of signatures per second rate, an average number of signatures associated with each cluster index may be calculated. This average number of signatures is then modified to take into account statistical variations in the number of signatures in each cluster and to take into account the size of the reference database to determine the maximum number of signatures, as used herein.

Figure 2E:
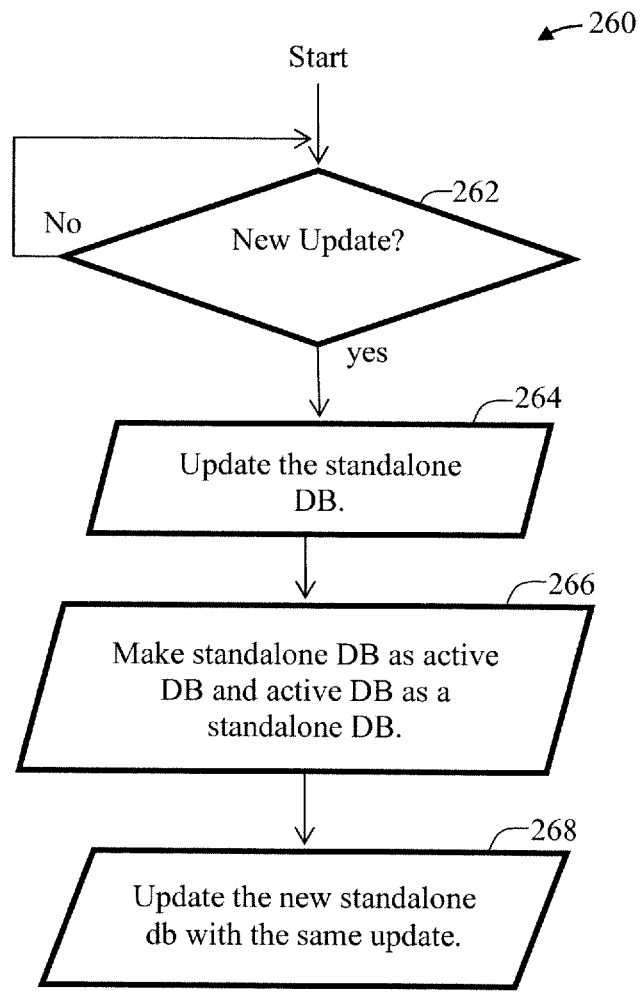
FIG. 2E illustrates an exemplary method to update a signature database using replicated databases in accordance with the present invention.

A first method of implementing database for fast updates and without using locks uses two databases for fast updates. These two databases are in addition to databases that are not to be changed. FIG. 2E illustrates an exemplary method 260 to update the signature database using replicated databases in accordance with the present invention. Initially, before the search system starts, two databases are created using the initial reference signatures. Thus initially these two databases are duplicates of each other. A search method uses a selected one of the two databases to search for content matching the search queries. This selected database is called an active database while the other database is called as a standalone database. At step 262, a determination is made whether a new update has been received. If no new update is received, the process 260 returns and waits until a new update is received. If new update has been received, the process 260 proceeds to step 264. At step 264, the standalone database is updated with the new signatures associated with the new update. At step 266, when the update operation is finished, the two databases are switched, such that the standalone database becomes the active database and the active database becomes the standalone database. At step 268, the new standalone database is also updated with the new update and the active database is used by the search algorithm for the next update received. The process 260 is termed as a ping-pong implementation.

Figure 2F:
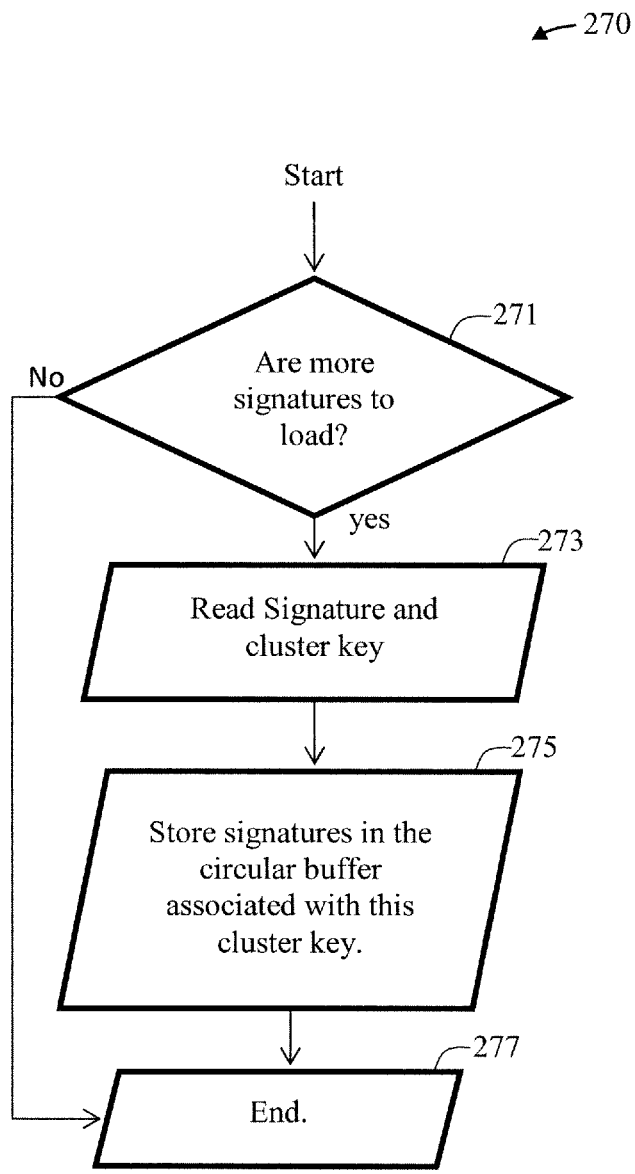
FIG. 2F illustrates an exemplary method to update a cluster index database by use of circular buffers in accordance with the present invention.

A second method of implementing database for fast updates and without using locks makes use of circular buffers. FIG. 2F illustrates an exemplary method 270 to update a cluster index database by use of circular buffers in accordance with the present invention. A circular buffer, having a capacity appropriate for the maximum number of signatures calculated to be generated within a specific time, is allocated for each cluster key and used to store the signatures. The circular buffer data structure can be implemented within a section of memory. Specifically, for example, a section of a memory that has an identified beginning location and an identified end location can be considered as a circular buffer. The buffer is filled starting from the beginning location and is full when the end location is filled. Then for the next entry, the previous entry at the beginning location is overwritten because it is a circular buffer and further updates overwrite the next sequential entries. Thus the overwritten entries are lost. The method 270 is designed in such a way that by the time the entries are overwritten another copy of the content signatures has been created somewhere in the search system. For example, since the previous signatures which may be overwritten are likely to be for a lapsed event, these previous signatures may have been placed in another search tier since there are probably much fewer viewers watching the lapsed event. Additionally, even if the likelihood of overwriting reference content is low, the likelihood of missing a possible match due to a single overwritten signature is much lower. Hence a system with this fast update method will be able to detect a target likely reference content with very low probabilities of missing a possible content match.

It is noted that there a number of reasons the capacity of a circular buffer may need to be changed. For example, as the capacity of the reference database increases, the size of the circular buffer may need to be increased as well. In one embodiment of the present invention, a monitoring approach is utilized. For each signature that is overwritten in the circular buffer, a time difference between the time stamp of the new signature and the signature being overwritten is calculated. If this difference is less than a predetermined amount, a counter associated with that cluster key circular buffer is incremented. If the counter exceeds a predetermined threshold, the capacity of the circular buffer is increased again by a predetermined amount. After a circular buffer's capacity has been changed, the counter is reset. The counter may also be reset for other situations.

In FIG. 2F, at step 271, a determination is made whether a new real time-update is received by the search system. If no real time update is received, the process 270 ends until a new real time update is received. If a real time update is received, the process 270 proceeds to step 273. At step 273, the signatures and associated cluster keys are read. At step 275, the signatures are stored into the corresponding circular buffers associated with the cluster key. The signature is always stored after the location where the last signature in this cluster was stored. Because the buffer is circular, if it is full, then a newly read signature is stored at the beginning of the circular buffer. Thus the signature that was written at the start of the buffer would be replaced by the new signature. At step 277, the process ends.

By providing an adequate storage capacity in the circular buffers, the method 270 doesn't generally need to calculate the total number of signatures in the update file and check if there is enough space to store these signatures in the signature buffer. With adequate capacity in the circular buffers, this update method 270 can be implemented without any read/write locks. The speed up in the updating process in this architecture is obtained at a risk that some overwriting of content signatures may occur. However, such risk is minimized by having sufficient capacity that by the time entries are overwritten, another copy of the content signatures is created somewhere in the search system.

Figure 3:
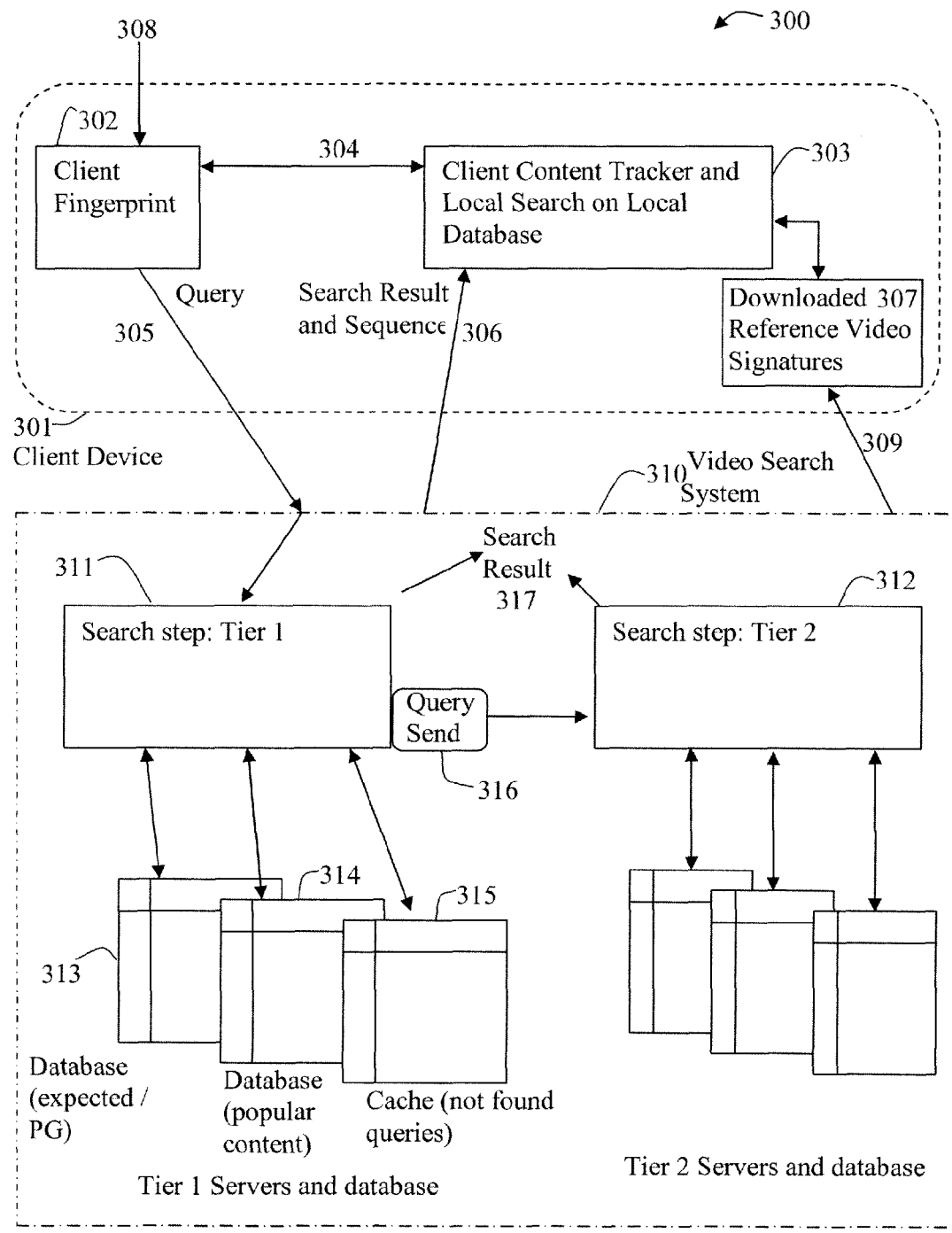
FIG. 3 illustrates a method of performing distributed search with remote client content tracking and searching using centralized tiered search servers in accordance with the present invention.

FIG. 3 illustrates a method 300 of performing distributed search with client content tracking and searching and using centralized tiered search servers in accordance with the present invention. The distributed search and video tracking are performed on a client's media database using correlation and local cache searches based on an index lookup. An index lookup may be performed using an index based on a cluster hash generated from content descriptor and associated data and another index may be used based on content id, time, and feature class. The client device 301 is configurable to execute a fingerprinting and analysis step 302 and content tracking and content search step 303 utilizing a database of content descriptors and signatures 307. Streaming video 308 received at the client device 301 which is operated on by the client fingerprinting and analysis step 302. Fingerprints that are generated are sent as a query 305 to the video search system 310. The video search system 310 includes tier1 search step 311 that searches one or more of content databases 313, 314, and 315. If no result is found in tier 1 search, then the query 305 is sent in step 316 to tier 2 search step 312. If a matching result is found in the search system, the search result 317 is indicated and sent on a path 306 to the client device 301 and specifically to the client tracking module 303. The reference signatures are downloaded from the search server(s) to the remote client via downloading step 309.

Figure 4A:
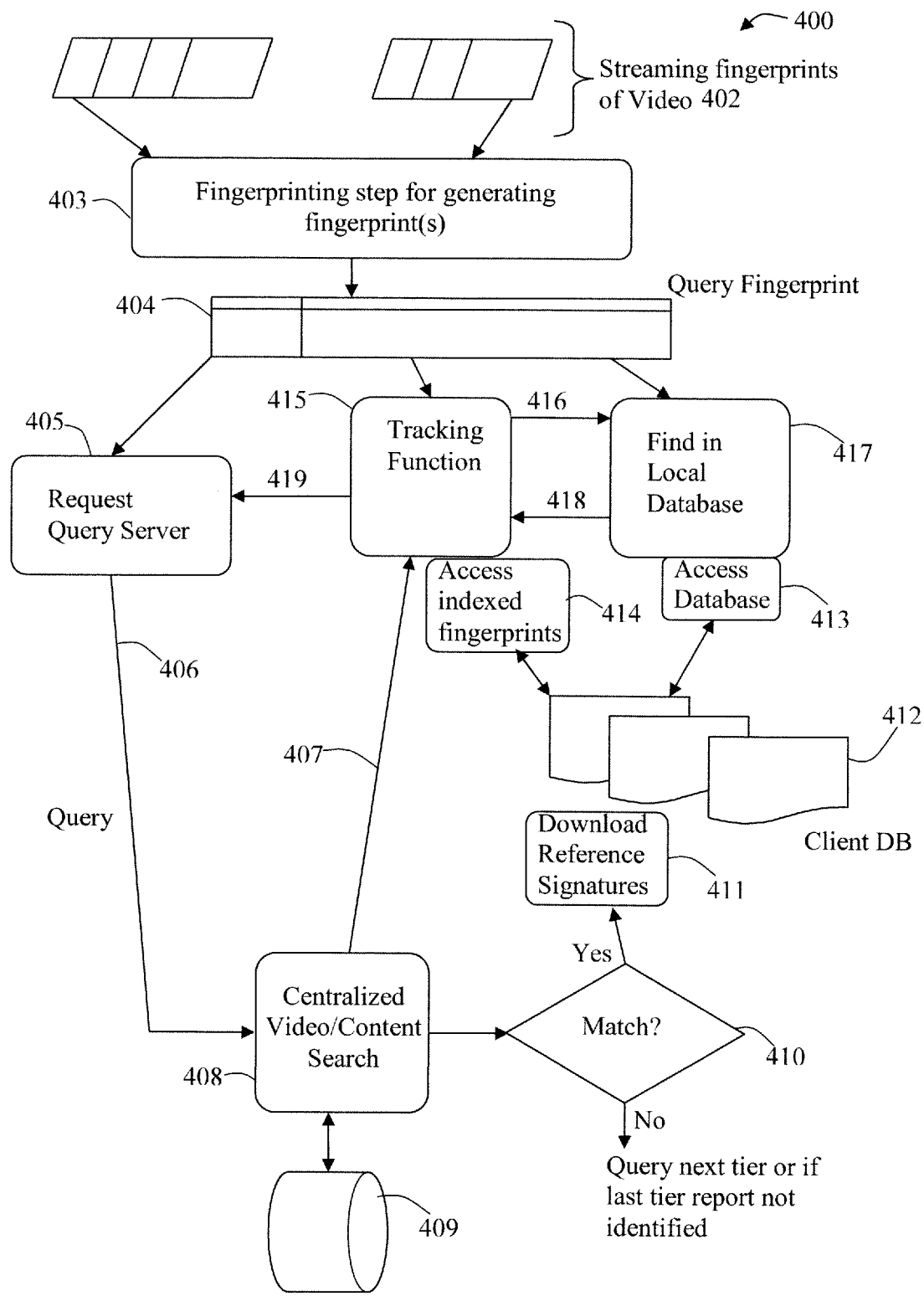
FIG. 4A illustrates a method of performing distributed search with client content tracking and searching using centralized tiered search servers in accordance with the present invention.

FIG. 4A illustrates a method 400 of performing a distributed search with client content tracking and searching using centralized tiered search servers in accordance with the present invention. Streaming video 402 at a client device feeds into the fingerprinting step 403 of the client device. The generated fingerprints 404 are stored locally on the client device. Each client device may receive a different stream of video and thus may generate a different set of fingerprints that are stored locally. The generated fingerprints are used to query the search system. For example, after a match is detected, fingerprints may be tracked locally and a query to a centralized server may not be necessary. At step 405, a client device's client query module sends a query on path 406 to a centralized video and content search server which is searched at step 408. The video and content search server(s) accesses video and content indexed databases at step 409. If the search server detects a match, it is returned as the match result 407 which is sent to the client device. The match result 407 is used to initiate the tracking function at step 415. The search server at step 410 makes a determination whether to download signatures from the search servers to the client device. If there is no match, then at step 410, a query can be sent to the next search tier, if any, and if this is the last tier report not identified. At step 411, the matching video fingerprints are downloaded to the client device, and the signatures are stored locally on a client database 412. The purpose of the client database is to perform continual tracking of content at the client. Alternatively a cache of downloaded reference signatures could be stored in advance on the client device. At step 415, the tracking function continues matching the content playing on the client to the downloaded reference. The tracking function utilizes knowledge of the matching points identified by search at the central search system, to predict and evaluate the likely matching locations for currently played content on the remote client. The search sequence tracking function at step 415 accesses the indexed fingerprints via step 414. When the sequence tracking function loses track of the match between query and reference videos the tracking function initiates a local find function at step 417 via a find command 416. At step 417, the local find function accesses the video database via step 413. At step 417, the local find function reports if it finds a match to the tracking function. This is communicated to the client query module, which at step 405, determines whether to continue searching locally or to send a new query on path 406 to the centralized video and content search server which is searched at step 408. The ability to perform sequence tracking on a client device can reduce the search load on central servers significantly. This is advantageous for reducing search time and over all searching costs. Additionally, the latency for identification can also be reduced. Advanced methods such as scene change detection or reduced sampling of signatures can be used to reduce the size of fingerprints downloaded to perform tracking search.

It is noted that a scene change is an event where video content changes significantly and can be identified by finding a local peak in results from filtering images or audio content.

While tracking the matched query at the remote client the downloaded fingerprints can be sampled to reduce the downloaded fingerprint size. An adaptive thresholding technique is used with lower threshold for tracked content based on statistically learned models. For example, a statistical model indicates that for a match with a 95% confidence of being a correct match a threshold is required that is at least 20% of the maximal score. The U.S. patent application Ser. No. 12/141,337 filed on Jun. 18, 2008 entitled "Method and Apparatus for Multi-dimensional Content Search and Video Identification" and incorporated by reference herein in its entirety describes how a threshold can be derived for a given query. For a tracking query, as described herein, a relative difference between two thresholds, one for time t1 and another for time t1+t2, can be used to determine a new threshold for a tracking query over time t2. For example, ThresholdTrack(t2)=Threshold(t1+t2)−Threshold(t1); where ThresholdTrack(t2) is the threshold for tracking query over time t2, Threshold(t1+t2) is the threshold for detecting a match over time t1+t2, and Threshold(t1) is the threshold for detecting a match over time t1.

Figure 4B:
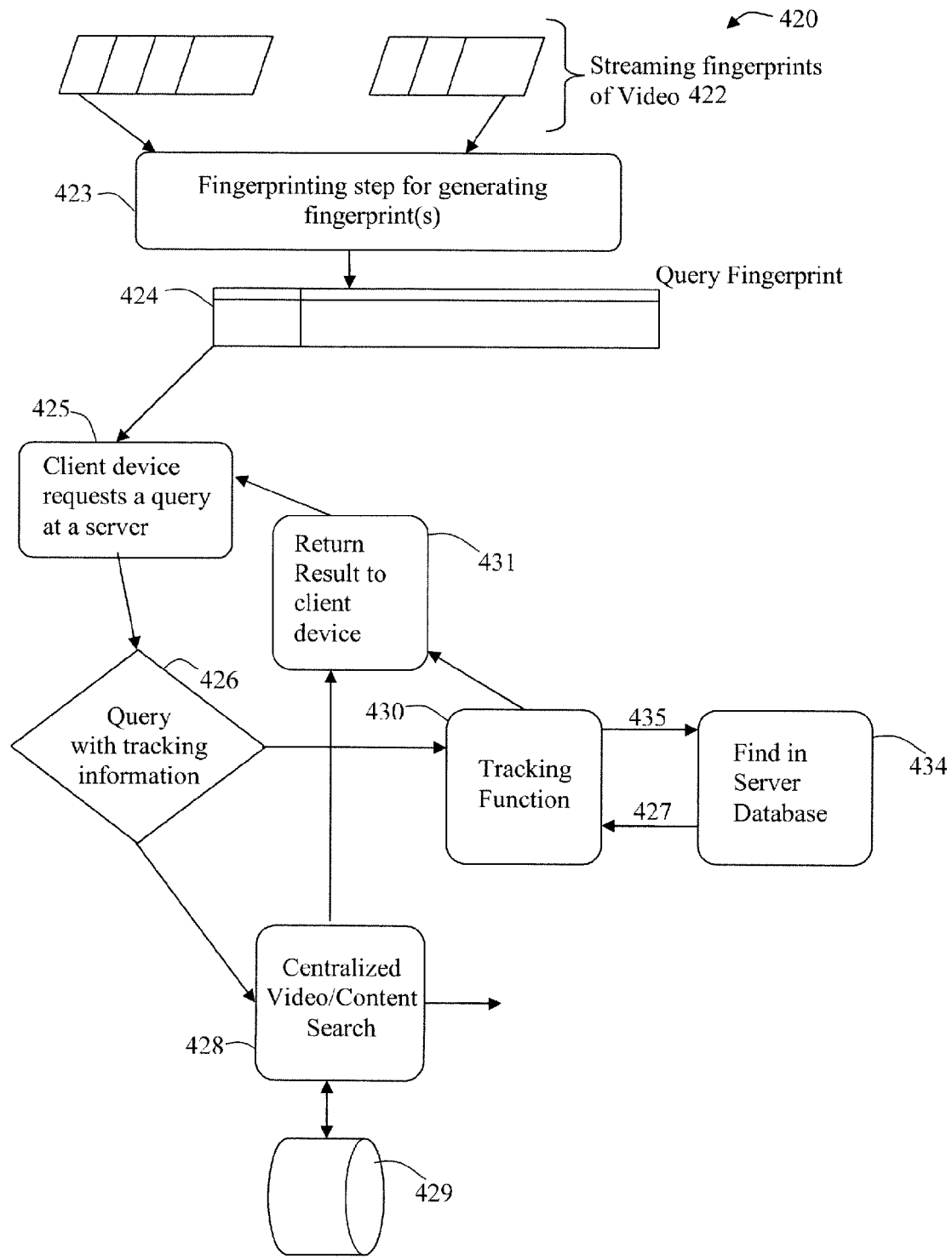
FIG. 4B illustrates a method of performing tracked search on centralized tiered search servers in accordance with the present invention.

FIG. 4B illustrates a method 420 of performing a tracked search on centralized search servers in accordance with the present invention. The query in this case indicates whether a previous match has been detected and this is a continued query. The query also includes a matching reference query time and a reference content alignment.

Streaming video 422 at a client device feeds into the fingerprinting step 423 of the client device. The generated fingerprints 424 are stored locally on the client device. Each client device may receive a different stream of video and thus may generate a different set of fingerprints that are stored locally. The generated fingerprints are used to query the search system. At step 425, a client device's client query module sends a query via step 426 to a centralized video content search server which is searched at step 428. If the search server detects a match, it is returned at step 431 as the match result which is sent to the client device. In further queries where a previous match is indicated, the step 426 sends the query to the tracking function at step 430. The tracking function utilizes knowledge of the timing alignment identified by search at the central search system, to predict and evaluate the likely matching locations for currently played content on the remote client. The search sequence tracking function at step 430 accesses the indexed fingerprints in the central database at step 434. If the sequence tracking function at step 430 loses track of a match, as indicated at step 427, between a query and reference videos, it can initiate at step 435 a search on the central database at step 434. At step 431, the match result coming from the tracking function or the central server is communicated to the client.

Figure 5:
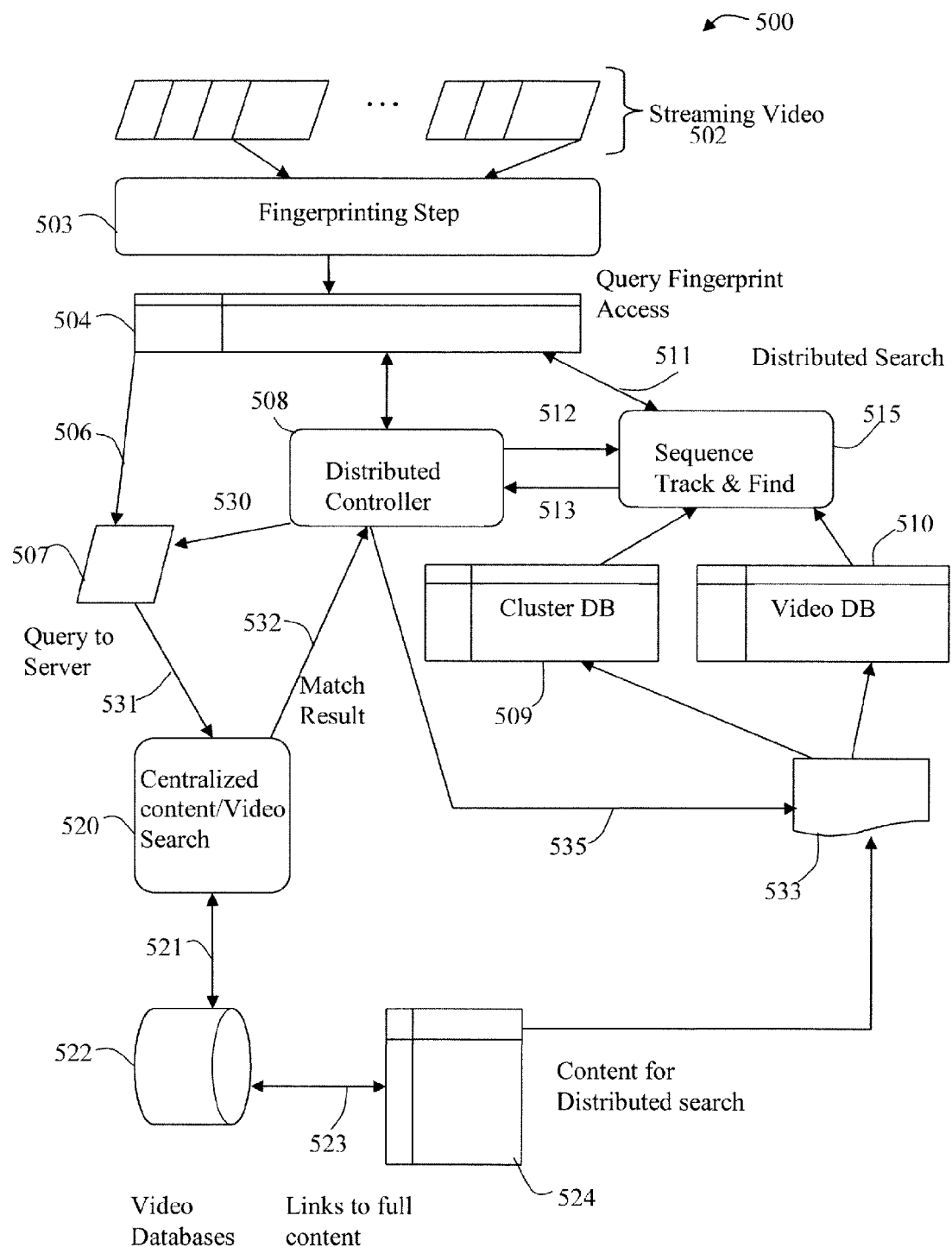
FIG. 5 describes a process of performing distributed content search with distributed databases in accordance with the present invention.

FIG. 5 describes a process 500 of performing distributed content search with distributed databases in accordance with the present invention. The process 500 supports an option of performing search locally on remote devices and deciding to query a centralized search server when content is not found locally on the remote devices based on certain conditions being met. If the query that is not identified matches rules for certain content types, then a server search may not be initiated. For example, the query may match an advertisement classification, not found locally on the remote device. Streaming video 502 at the client device feeds into the fingerprinting step 503 of the client device. Each client device may receive a different stream of video and thus may generate a different set of fingerprints that are stored locally. The generated fingerprints 504 are stored locally on the client device and these are used to form a query. These generated fingerprints at client device can be used to query the server or to track or search locally within the client device. At step 508, a distributed controller controls the process of querying at a centralized search server or doing search operations locally. In one embodiment, the distributed controller first performs a search locally on one or more client devices, and evaluates the classification of the query and based on the result of the classification decides whether to query the centralized search server. At step 507, a client query module sends the query received from the distributed controller to the centralized search server. The client query module sends the query on path 531 to the centralized search servers where the query is searched at step 520. If a match is detected, a match result 532 is returned to the distributed controller for use at step 508. At step 535, the distributed controller then requests a download of matching video fingerprints 533, for local caching on the client devices. The distributed controller module converts the downloaded fingerprints into two indexes for easy access to search functions. One fingerprint index is called the cluster DB index, which is generated using the signature descriptor and associated data locally on the client devices or may be downloaded from the centralized server to the client devices. The other index is called the video DB index and is generated using the video content id and reference time of the video content locally on the client devices or may be downloaded from the centralized server to the client devices. The cluster DB index is used to access cluster DB 509, and the video DB index used to access video DB 510. The downloaded cluster DB index is further processed to generate a configurable length local cluster index. The main search functions are sequence track and local find 515, which access the indexed fingerprints. Sequence tracking continues matching of identified sequences, by evaluating signatures at the predicted time location of the reference signatures, according to a time line of the reference content. If tracking is lost, no more matching with expected, then a local search operation is performed. The distributed controller controls the search function and the complexity of searching in selected database search space through command on path 512 and receives results of search operations through path 513.

Figure 6:
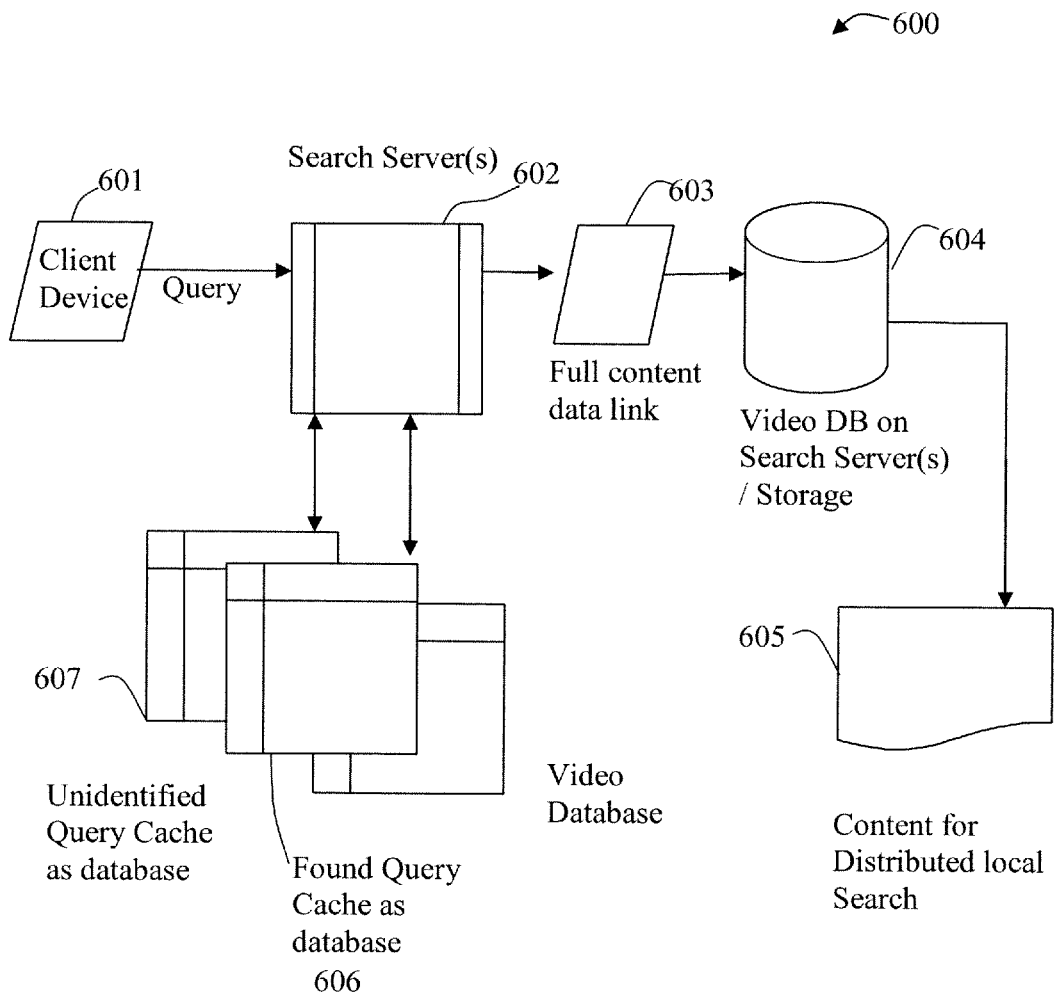
FIG. 6 shows a system for content search and monitoring with popular query caching, including unidentified query caching in accordance with the present invention.

FIG. 6 illustrates system 600 for content search and monitoring with popular query caching, including unidentified query caching in accordance with the present invention. The system 600 comprises a client device 601 for generating a query, a centralized server(s) 602, a data link 603 to a video database 604 associated with the centralized server(s) 602. The centralized server(s) 602 include an found query (FQ) cache 606 acting as a first mini-database and an unidentified query (UIQ) cache 607 acting as a second mini-database. The FQ cache 606 stores the content that matches frequent queries. The UIQ cache 607 stores frequent queries that are not identified in the database. The unidentified query content from previous searches is added to a "unidentified database" in the UIQ cache 607. Query content resides in the UIQ cache 607 to be used by the centralized server(s) 602 in new search operations to identify popular "undetected content", until such content is aged out of the "unidentified database". If queries with similar content are repeated then the count of repeat viewing of each unidentified content is updated. The "unidentified query database" is thus used to generate popular "unidentified queries" which will reside in the search tier 1 servers. The management of the "not found query" database includes methods to age out queries that become infrequent, and methods to remove "not found queries" when newly added content matches the query in the "not found query" database. Deletion from "not found query" occurs when addition of new content to search database is added.

Aging out of cached signatures is performed by ordering the cached content by the count of recent accesses and removing content that is accessed less often. A count of recent matches to each cached content is maintained and used to determine which cached content is to be removed.

The above method will reduce the query load cost on the search servers. If this method was not available, then the search cost can still be significantly large when significant fractions of the queries are not identified. For example, the queries (signatures) are selected for caching so as to reduce the search load on the tier 2 and lower search servers. If a significant portion of content that is watched on the client device 601 is not in the searched video database 604, such as 30% of the content watched, then these 30% queries will be added to the next search tier. However, if the more frequent queries that are not found are identified and further queries are avoided into the rest of the search system's other tiers, the percentage of queries to the remaining and largest part of the search servers can be reduced to say 10% instead of 30% in absence of this method. This represents a very significant gain in search performance. For example, if the subsequent search tier has 100× larger DB than the previous tier, then 30% of queries into this tier requires 30 times more search cost than if the query could have been applied to the first stage. Thus the cost of searching in the second tier, in this example, is the dominant search cost. By reducing the % of queries going to the next tier, in this case 30% to 10%, the method described herein provides a major search cost reduction (3× in this case).

A query popularity analysis process is used for queries that are identified. The identity of matching content and its frequency of querying are stored, and when the minimum matching queries and the rate of querying for a specific content is greater than an established threshold, the signatures for the identified content are selected to be in the database or as temporary cache of first or higher tiers of the search servers.

In contrast the U.S. patent application Ser. No. 13/102,479 titled "Scalable, Adaptable, and Manageable System for Multimedia Identification" filed 6 May 2011 describes "caching" with reference to FIGS. 15A-15C at pages 53-56 using methods of creating a hash index for each popular queries that are found.

Figure 7:
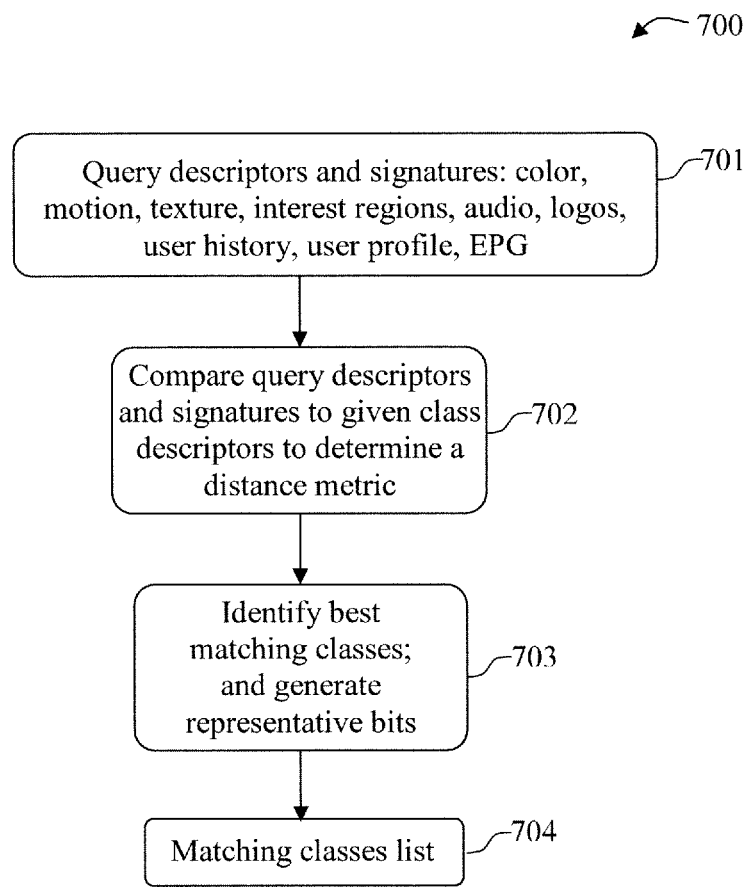
FIG. 7 illustrates a method of classification of query content using query content based fingerprints in accordance with the present invention.

FIG. 7 illustrates a method 700 of classification of query content using query content based fingerprints in accordance with the present invention. The following exemplary set of classification methods may be used to classify the video clips at the remote client device. Classification on a combination of detected features and descriptors such as color descriptor, motion activity, detected objects, including facial recognition, object action, background translucency, reflectivity, and color, logos in video, type of sound, such as voice, type of music, chatter, loud, soft, silence. Each video's assigned classification parameters are compared against a set of classes, which can be defined at the central system or can be generated based on user profile. Class based on user profile is one possibility. In some cases it can be useful. For example, if a user is known to watch baseball games, and either the timing for a query coincides with baseball programming or some features in the query is associated with baseball, then the search system may still select baseball as one likely class for this user since a higher weight would be attributed to baseball for this user, based on his user profile. If the distance measured between a video clip's classification parameters and the values of each class's parameters are within a specified threshold, then the video is considered a member of that class.

Classification for search partitioning by servers is used to reduce the search cost. Classification may be used to direct the video query to specific second tier and lower search servers. This method of targeting a video query to specific databases likely to have videos with similar classification reduces the cost of searching by orders of magnitude while losing little or no accuracy.

Classification for search partitioning by database partitioning on each server can be used to partition the local databases at an index level on each server. This method of partitioning database by index based on classification also reduces the cost of searching by orders of magnitude while losing little or no accuracy. The encoded bit representation of the classification information is used to speed up search operations, by utilizing these encoded bit representations are used as index lookup addresses for quick access to both query and reference information, for example. These encoded bit representations are a compact form of information useful for a targeted search in particular databases. This method relies on further sub-dividing the database for first search step by using the classification bits in the index.

System users can decide to use classification at any search level, from client search, to tier1 search, or tier2 search and so forth based on considerations of the cost and tolerable reduction in accuracy.

The method 700 of FIG. 7 begins at step 701, where the descriptors and signatures available for a given video clip and within time frame for audio signatures are collected. Other known or identified information about the content can be used to classify the video clip. This information can include an identified program logo, a user's history of recent viewing or statistics of user's queries, user profile, and content identified from an EPG. At step 702, distance measures are taken for the given descriptors and signatures to previously identified classes and their descriptors and signatures. The nearest classes that match, by having the smallest distance metric, are identified in step 703. The identified classes are used to limit search to certain parts of the database and speed up the search. At step 704, the query signatures are submitted with the class id(s) which are represented as encoded bits to a search operation. The additional class bits are used to narrow the search operation in the large databases.

Figure 8A:
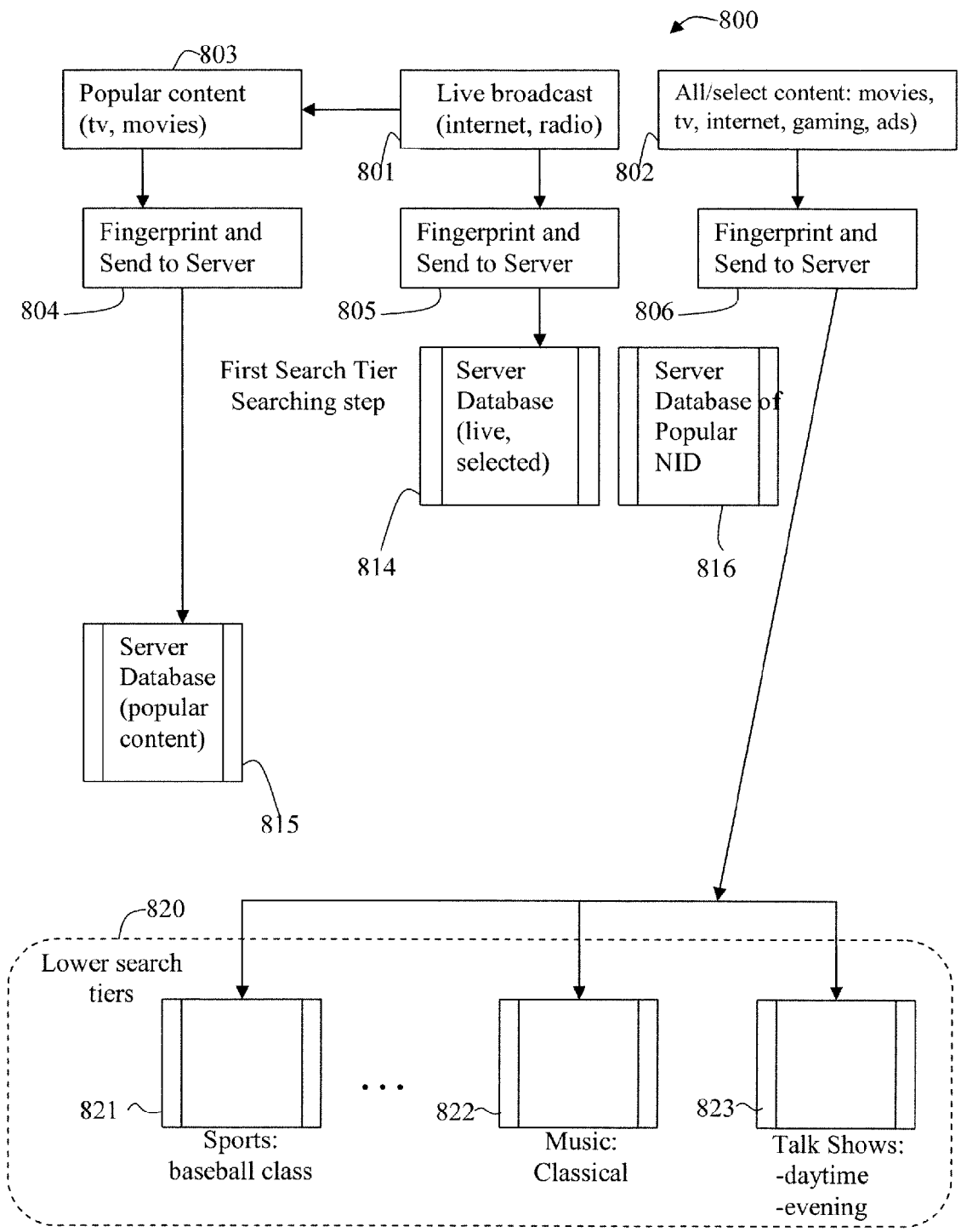
FIG. 8A illustrates a method of organizing a search database for a scalable content search system in accordance with the present invention.

FIG. 8A illustrates a method 800 of organizing a search database for a scalable content search system in accordance with the present invention. In FIG. 8A, content is organized into various search servers for a large scale content search system. Content is categorized into popular content and important content that needs to be identified. Live or real time broadcast content is received from live streams, fingerprinted, and added to the content database. A subset of popular content, selected content and selected live content are fingerprinted and added to a database of the first tier. As illustrated in FIGS. 2E and 2F, the first tiers present significant performance gains by having a small database and fast updates. Hence it is useful to be able to update many of the most likely viewed channels in the first tier database, and often in one or few servers. Hence, update rate is useful in determining the number of servers required to update a specified and possibly required number of broadcasts and live streaming channels.

The method 800 for organizing a search database utilizes database management techniques that include processing of popular content at step 803, fingerprinting and adding associated metadata in step 804, and adding the fingerprints and the associated metadata to a search server popular content database in step 815. The popular content will thus be added to a given search tier, often the second tier. In some cases, it is determined that the first tier will include some select popular content and the popular live broadcast and streaming channels since live broadcast constitutes a majority which may be at times almost 80% of TV viewers. A good portion of the popular content will then be stored in the second tier and the less popular content in lower tiers. Selected live broadcast content from radio or internet or cable and selected popular content is processed at step 801, fingerprinted and combined with metadata in step 805, and added to the first tiers search servers at step 814. All other relevant content is processed at step 802 including gaming, movies, TV shows, internet programs, advertisement. Such content can be added to other tiers if statistically determined to be relevant such as occurring more than a threshold of ten queries a day, for example. However, such content is generally added after fingerprinting and metadata addition in step 806 to the lower search tier servers at step 820, to support searching baseball content at step 821, searching classical music content at step 822, talk show content at step 823, and the like.

A not identified (NID) database of queries is collected during search operations and added typically to the first or second tiers, wherein content identified to be more frequent or more likely is added to the first tier and content identified to be less likely is added to the second tier. The NID database is added to search servers in step 816.

Figure 8B:
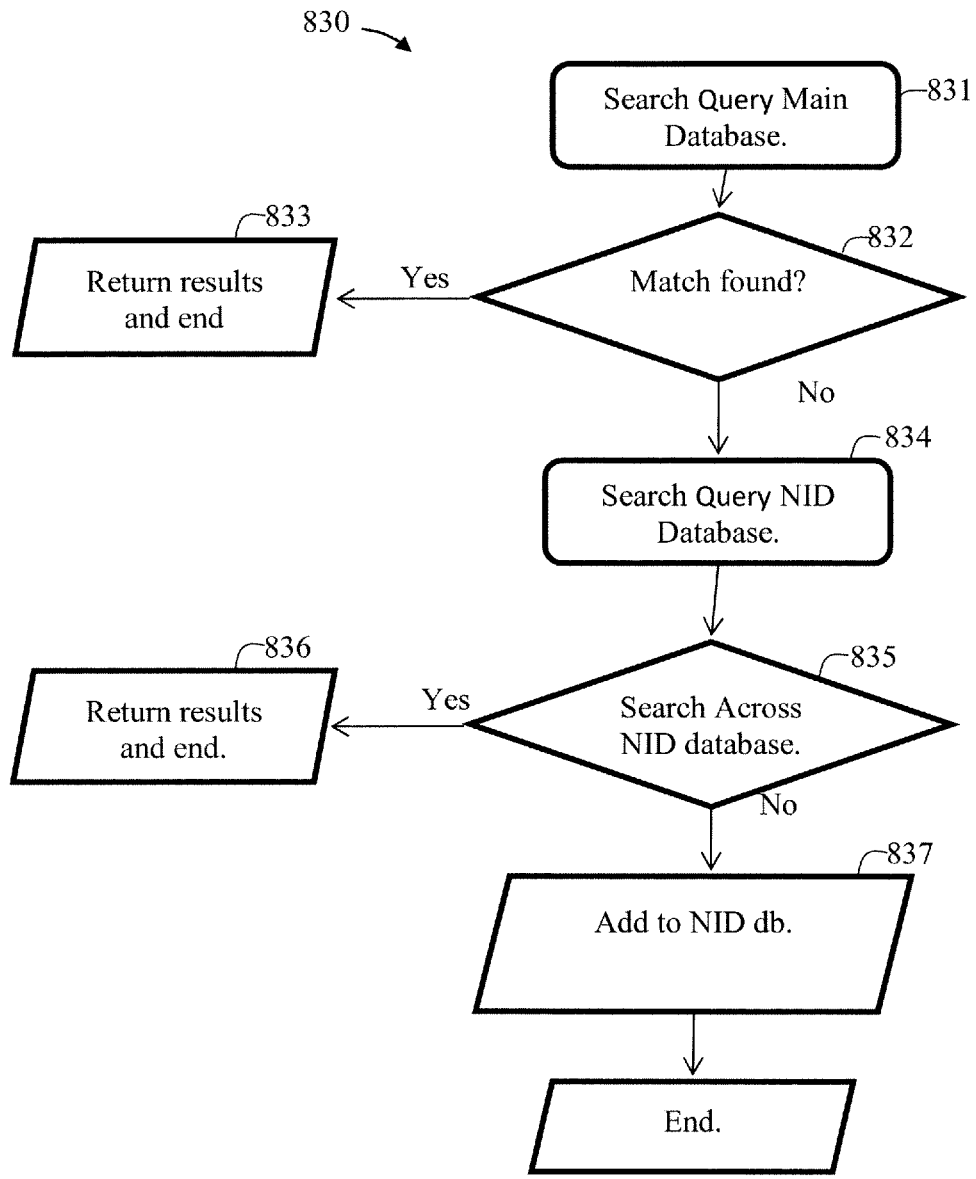
FIG. 8B illustrates a method of creating a not-identified database for a scalable content search system in accordance with the present invention.

FIG. 8B a method 830 of identifying the not identified queries (NID) queries and of creating the not identified database (NID DB) reference database generated by these queries. The method 830 tracks queries that are not identified, which are the queries for which no match is found in the reference database, and creates a reference database for these NID queries to be searched for other queries. The motivation behind storing the NID queries into the NID DB is that some content may become suddenly popular due to a large interest triggered by some temporal cause. However, this content may have not been received and processed in the reference database. Such content could be captured by storing such queries to the reference database. Of course not all the NID queries can form a legitimate reference database hence a mechanism to remove such less important NID queries from the reference database is utilized. At step 831, a query is received and searched in the search system. At step 832, a determination is made whether a match is found. If a match is found, then the process 830 proceeds to step 833. At step 833, the results are returned to the remote client device. If the match is not found, for example, the query is not identified, then the process 830 proceeds to step 834. At step 834, the query is searched across an NID database. At step 835, a determination is made whether a match is found in the NID database. If a match is found the process 830 proceeds to step 836. At step 836, the results are returned to the remote client device. However, if match is not found, the process 830 proceeds to step 837. At step 837, the query is added to the NID database and then the process ends. When the query is added to the NID database at step 837, the search system can request the query client to send more information, such as the program name, channel or the uniform resource locator (url) of the content associated with the query to be stored as metadata in the NID database. The NID database may be maintained using caching strategies, such as Least Recently Used (LRU) or Least Used to keep the NID database size under a predetermined limit. The search operation at step 831 may consist of online accesses by client queries and offline accesses for content management purposes in the search database and may be carried out by a single tier or multiple tiers. The NID database may itself be organized in various ways described in this patent or in the U.S. patent application Ser. No. 13/102,479 titled "Scalable, Adaptable, and Manageable System for Multimedia Identification" filed 6, May, 2011.

Figure 8C:
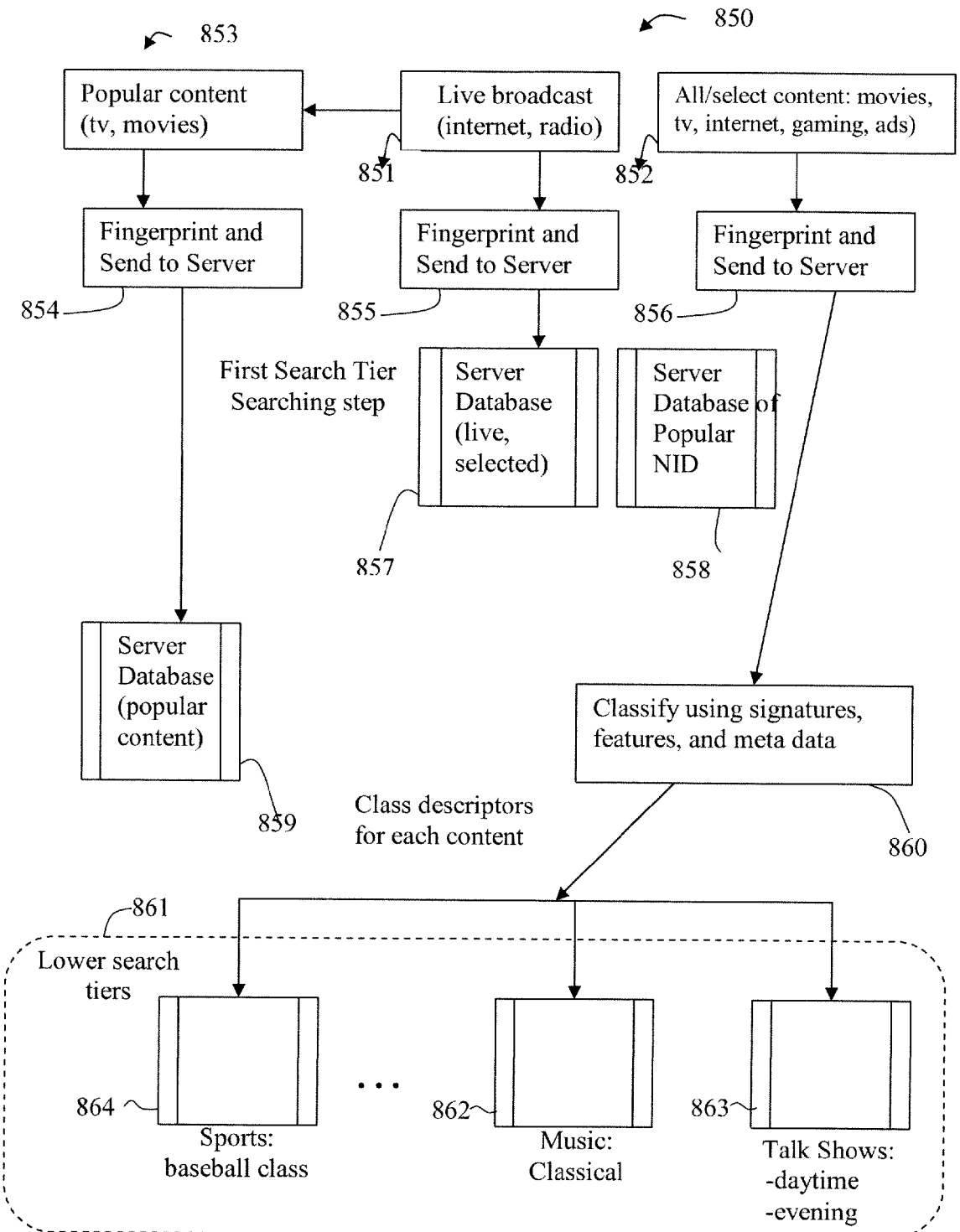
FIG. 8C illustrates a method of organizing a search database with classification for a scalable content search system in accordance with the present invention.

FIG. 8C illustrates a method 850 of organizing a search database with classification for a scalable content search system in accordance with the present invention. In FIG. 8C, content is organized after classification of content for the various search servers for a large scale content search system. Each query content received is assigned a list of matching classifications so that the received queries can be directed to specific databases associated with these classes with a high likelihood of correct assignment. Classification of the content is performed using signatures, metadata, and content metadata such as information concerning studio, actors, and the like. Classification enables targeting of queries to specific search servers thus reducing search costs for very large databases. Alternately, classification is performed not across servers but added to individual signature indexes, as described for the process 210 of FIG. 2B.

Live or real time broadcast content is received, fingerprinted, and added to the appropriate database from live streams to the content database. A subset of popular content, selected content, and selected live content are fingerprinted and added to the appropriate database of the first tier. As presented in FIGS. 2E and 2F, the first tiers can present significant search performance gains by having a small database and fast updates so that as many of the most likely viewed channels are in the first tier database.

The method 850 for database management includes processing the popular content at step 853, fingerprinting and adding metadata at step 854, and adding signature and metadata database to search server at step 859. The popular content is added to a given search tier, often the second tier. Selected live broadcast content from radio or internet or cable and selected popular content is processed at step 851, fingerprinted and combined with metadata at step 855, and added to the first tiers search servers, at step 857. Other relevant content, including gaming, movies, TV shows, internet programs, advertisement is processed at step 852 and can also be added to other tiers if statistically determined to be relevant such as occurring more than a threshold of ten queries a day, for example. Such content is generally added after fingerprinting and metadata addition, at step 856. After classification at step 860, the query is directed, at step 861 to the lower search tier servers to support searching baseball content at step 864, searching classical music content at step 862, talk show content at step 863, and the like.

A not identified (NID) database of queries is collected during search operations and added typically to the first or second tiers, wherein the more likely content is added to the first tier and lesser likely content added to the second tier. The NID database is added to search servers in step 858.

Figure 8D:
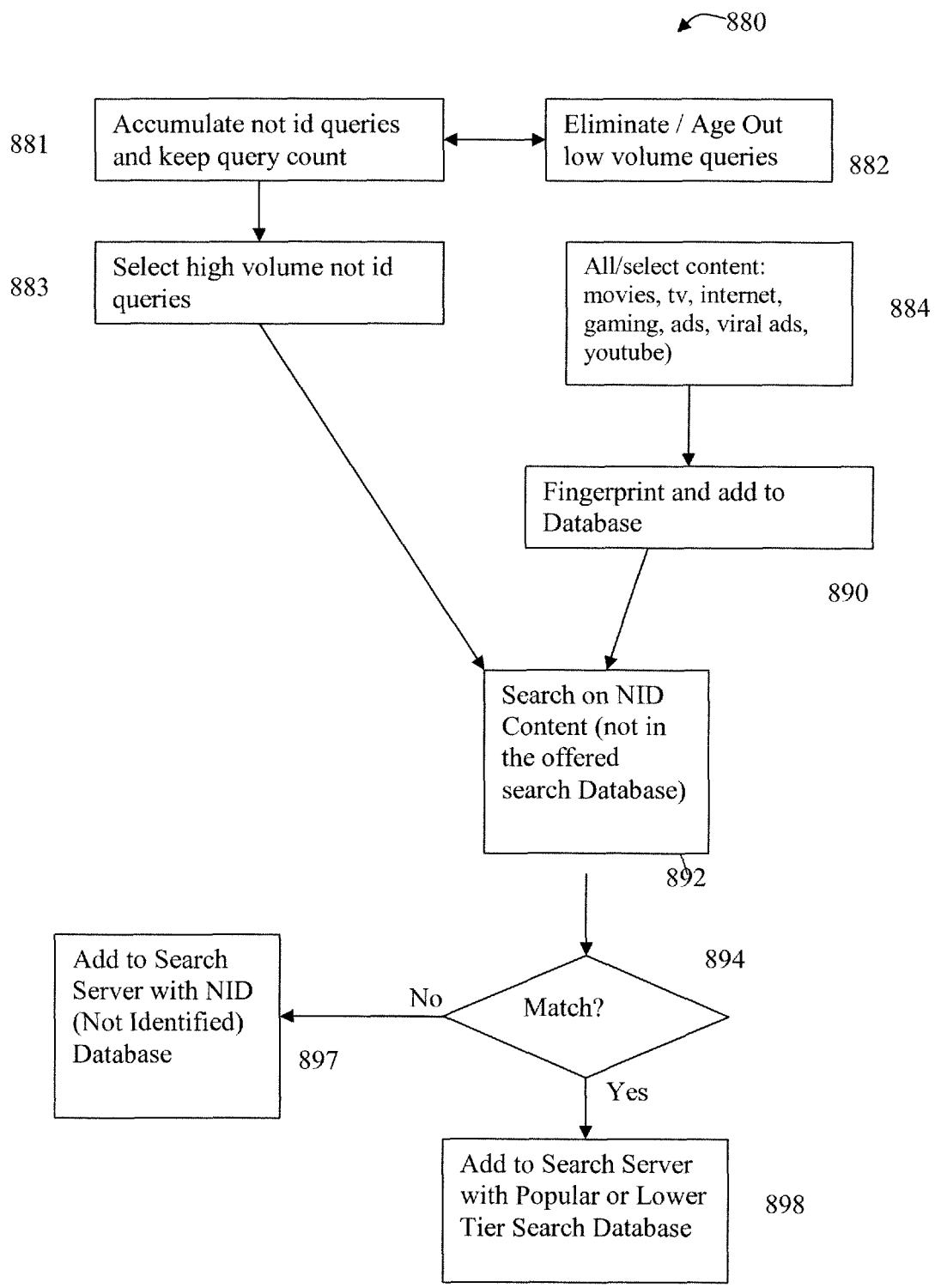
FIG. 8D illustrates a method of managing a not-identified database for a scalable content search system in accordance with the present invention.

FIG. 8D illustrates a method 880 of managing a not-identified database for a scalable content search system in accordance with the present invention. In FIG. 8D, the not identified (NID) queries are managed and utilized in a large scale content search system. FIG. 8D also illustrates how incoming queries that do not have a match (NID) are accumulated and selected for storage and further use. The accumulated NID queries are compared against a database of content to identify if it matches any. Based on query frequency statistics any NID queries that have matching content will be added to search system. If the NID queries do not match any content they will be added to the NID database in the search system. This mechanism of NID content management improves the accuracy of the system and also reduces search cost and improves search systems performance.

The method 880 for NID database management includes at step 881, accumulating not id queries and maintaining the query statistics. At step 882, an aging process is used that eliminates less frequent queries. One such method for elimination is removing the less frequent queries and the queries that have not matched recently. At step 883, high volume queries are selected. At step 884, other relevant content, including gaming, movies, TV shows, internet programs, advertisements, youtube videos, user generated videos, viral ads, and the like are fingerprinted and added at step 890 to search servers used to match against the NID content. If this NID content database is large relative to the search database accessed by content queries, it is most likely used offline and not on the search system accessed by remote client queries. In offline use, the NID content database is used more specifically for the purpose of identifying NID queries. At step 892, the process 880 performs queries using the NID queries to the NID content database search system. At step 894, a determination is made whether there is a match. If there is no match, the process 880 proceeds to step 897. At step 897, the process 880 adds the NID query signatures to the NID database in the main online search system. If there is a match, then the process 880 proceeds to step 898. At step 898, the signatures and metadata for the matching content, or sections thereof, are added to a search server in the main online search system. In the tiered search system, for example, the matching content of the NID queries could be added to the popular content search tier or to the lower search tiers. The query statistics for a given NID query can be used to decide the destination of the matching content.

Figure 9A:
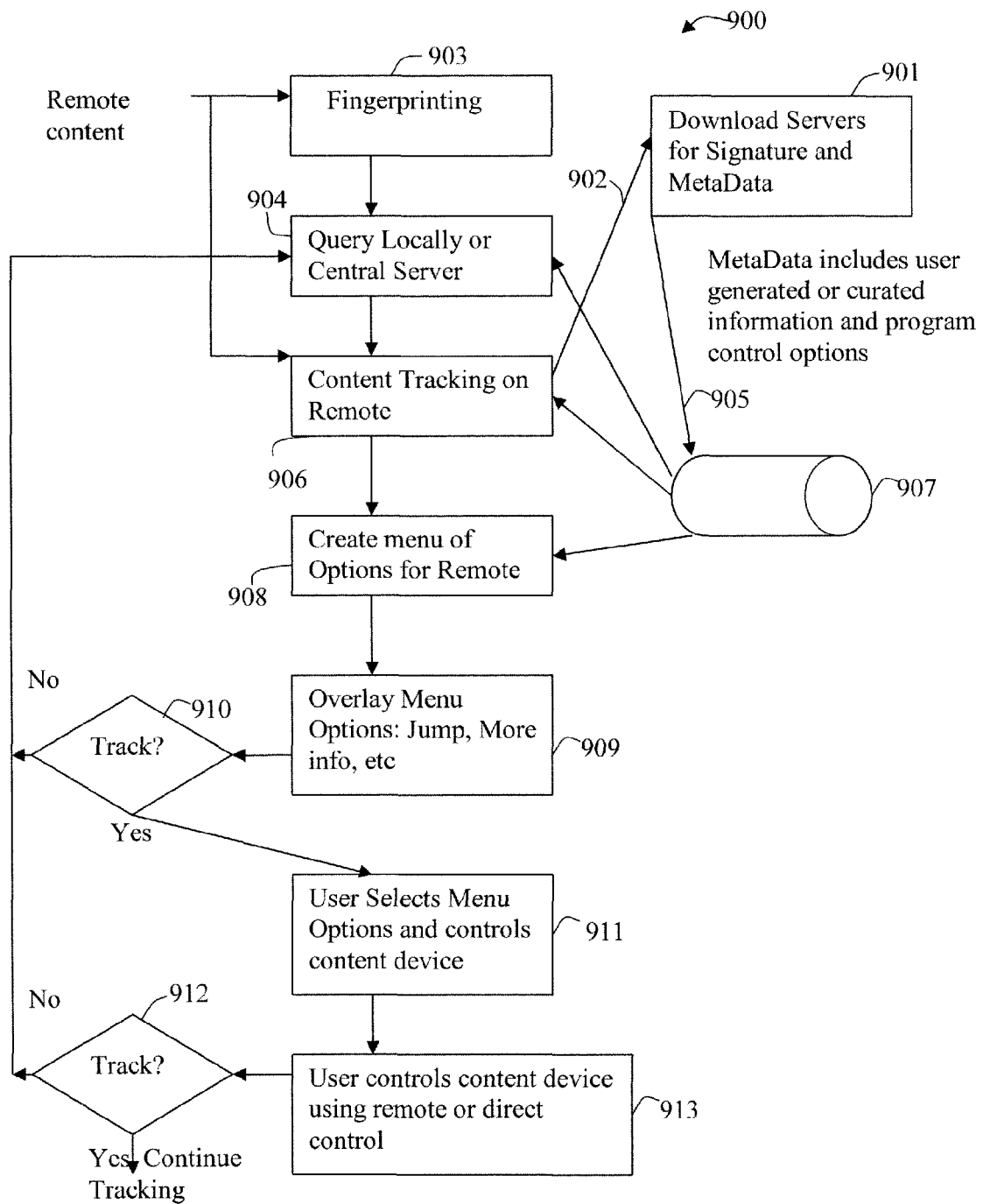
FIG. 9A illustrates a method of providing a customized overlay menu to a remote user for use with a remote search and tracking system in accordance with the present invention.

FIG. 9A illustrates a method 900 of providing a customized overlay menu to a remote user for use with a remote search and tracking system in accordance with the present invention. The method 900 provides a remote user with the benefit of a customized overlay menu while using remote search and tracking. A remote client device identifies content viewed remotely and may download additional reference signatures and related metadata. The metadata describes, in addition to content information, and other links such as a uniform resource locator (url) for a scorecard for the sports game that is being viewed, or url for a chat thread for the program content or more specifically at the time location in the program, various menu options associated with the matching content so that a user can view the content more meaningfully. For example, at any point in the media program the user can select a menu option to control channel selection and select more information. For example, menu options may include a first selection to go to a next highlighted program, a second selection to get more information about a show, actors, scene and the like, a third selection to view user comments from social network on second screen, and the like. The choice of menu option can directly control the user source device, such as a digital video recorder (DVR), a digital video disc (DVD) player, or the like. As the user continues to receive media content, the remote search and tracking system follows the content and offers menu options associated with the identified content.

At step 903, a remote client performs fingerprinting on remote content that has been received, and at step 904 performs local search or search on a central server. At step 901, download servers send signature and metadata to the remote client to be stored on local signature databases. At step 906, the remote client tracks the incoming query content against the locally downloaded and stored signature databases at step 907, and makes requests, on path 902 to the download servers if necessary.

At step 908, the remote client processes metadata links for identified time location of scheduled media content, such as a scheduled TV show, and generates relevant menu options for the user. At step 909, the generated menu options are displayed. The menu options can include options to skip to particular time locations in a program, or to skip to a set of program highlights or lists, or to provide other information about the program such as actors, scenes, directors, backstage shots, or to link to social network generated information. The user is able to select these options and enabled to view only program highlights, or get social network comments on the show on a second screen application. At step 911, the user selects the option and is then able to directly and transparently control the source device which may be a set top box, buddy box or DVR, or DVD player, via step 913. While the user is moving between different points in a given program, the remote search and track system tracks the played content at steps 910 and 912, and is able to provide the relevant menu options to the user.

In another example, a person watching a recorded program or DVD could watch a curated version such as highlights of program, or a PG-13 version, or R rated version, or a G rated version of the same program by selecting the menu options on a second screen or remote or a second screen device doubled up as a remote device. Additionally, the user could also select to choose menu options where they can get additional information about the movie or scene or engage in a social network chat or message thread related to the baseball game they are currently watching.

Overall the search and tracking function behaves as a silent observer and provides the user with choices for viewing on the TV screen or a main screen or a second screen. The choices for viewing can use a pre-programmed set of edited content, and social channels for communication, and generic information sources.

FIG. 9B illustrates a signature data structure 920 for use in remote synchronized applications. The remote data structure 920 includes the time stamp 921, signature 922, content identification (ID) 923, feature information fields 924 and link to the menu options and metadata 925. The data structure 920 defines a content database element at a given time in the reference. The content viewed by user aligns with a given content reference and a given time into that reference. The menu applicable at that point is the nearest time stamp 921 in the array of data structures. Thus the time stamp 921 is used to identify the relevant menu option. The signature field 922, at a given time stamp 921, and the signatures, typically more than one time instance and over a time range, are used to determine a match between query for remotely viewed content and reference content databases. The content ID 923 may contains a classification of the content based on class descriptors, suitable for directing a search to a classified search database. The feature information field 924 carries more information describing audio or video at the time index and time stamp 921. The additional fields, for example the feature information field 924, are useful in improving the accuracy of matching. The field 925 provides the link to menu options, at the given time index and time stamp 921.

FIG. 9C illustrates an exemplary menu data structure 930 suitable for use in a metadata based data structure for remote synchronized applications in accordance with the present invention. The menu data structure 930 is an array of menu options. In FIG. 9A at step 908, the downloaded metadata information 907 is converted to the data structure 930 so that it can used by a user device to control viewing of information from multiple sources and also to be able to display and control multiple viewing screens. The menu options are displayed on a user screen at step 909. At step 911, the selected menu option is executed. In each menu option, the field 931 provides the menu description and display and the time parameter field 932 has the program time link which can be used to directly skip to content or fast forward or reverse to a particular point. An action parameter field 933 includes an action to be taken such as control the source device and the commands to be sent to control other communication or content source devices.

The data structures and methods presented in FIGS. 9A, 9B, and 9C can be used to implement an embodiment of interactive selection, control and display of content by the user, and presentation of menu options that are context appropriate, after content has been identified as addressed herein, to the content viewed by user. The invention presents a method for publishing and interacting with video, audio, text content in a novel way by describing the control mechanism in a data structure as shown in FIG. 8B. The data structures 920 of FIG. 9B and 930 of FIG. 9C, enable publishing an existing DVD menu and program control, chapters, and enable user control on the user device, such as a tablet, laptop computer, smart phone, TV, or other such end user device. After content identification time points within the program can be identified and synchronized to by the user, the menu of control options for viewing the content can be downloaded by the user to their smart device, or tracked on a server. Thus, a user can, for example, select different options for viewing content on multiple screens. This invention brings together broadcast television or DVD, or cable and the internet, and interactive control allowing users to use and interact with the content in a novel and useful way. The user is thus able to watch and seamlessly combine various sources, such as internet streaming, internet text, broadcast TV and the like, on a screen of choice. The curator of content, which can be a producer of a program, or shared among expert users or selected users, may generate multiple menu options that can control the viewing with selected source control options, for example, and these multiple menu options form part of the metadata. The generation of the original content and the metadata along with its menu options for control represents a unique and novel media publishing method. The metadata along with the content signatures can be downloaded by a user to enjoy this unique and flexible viewing experience.

It is understood that other embodiments of the present invention will become readily apparent to those skilled in the art from the following detailed description, wherein various embodiments of the invention are shown and described by way of the illustrations. As will be realized, the invention is capable of other and different embodiments and its several details are capable of modification in various other respects, all without departing from the present invention. Accordingly, the drawings and detailed description are to be regarded as illustrative in nature and not as restrictive.

We claim:

1. A method for content searching, the method comprising:
   generating fingerprints, in a user device, for a unit of multimedia content;
   searching for the generated fingerprints in a found query (FQ) cache and in an unidentified query (UIQ) cache;
   searching in a remote reference database if the generated fingerprints are not found in the FQ cache or in the UIQ cache; and
   storing the unit of multimedia content and the generated fingerprints in the UIQ cache upon not finding the generated fingerprints in the remote reference database, wherein subsequent searches of the unit of multimedia content are found in the UIQ cache without searching the remote reference database.

2. The method of claim 1 further comprising: organizing the FQ cache and UIQ cache as a first tier database and the remote reference database as a second tier database.

3. The method of claim 1 further comprising:
   searching in the FQ cache for the generated fingerprints and returning to the user device a menu of options if a match is found in the FQ cache; and
   searching in the UIQ cache for the generated fingerprints and returning to the user device a not identified if a match is found in the UIQ cache.

4. The method of claim 3 further comprising:
   requesting the user to send information in response to the match indicating the unit of multimedia content is in the UIQ cache including a program name and program source of the content associated with the query to be stored as metadata in the UIQ cache.

5. The method of claim 1 further comprising:
   updating a count of repeated queries for the unit of multimedia content that is found in the UIQ cache, wherein the count is stored in the UIQ cache with metadata stored with the unit of multimedia content that is unidentified.

6. The method of claim 5 further comprising:
   aging out the count of repeated queries for the unit of multimedia content found in the UIQ cache according to a reduced number of query searches for the unit of multimedia content.

7. The method of claim 1 further comprising:
   updating counts of recent matches to generated fingerprints for separate units of multimedia content that are cached in the UIC cache, wherein the counts are used to determine which cached content is to be removed.

8. The method of claim 1 further comprising:
   storing a rate of querying for matching fingerprints found in the remote reference database;
   comparing the rate of querying with an established threshold to determine that the matching fingerprints represents popular content; and
   storing the matching fingerprints in the FQ cache for quick access.

9. The method of claim 1, wherein reference multimedia content is stored in the remote reference database in categories according to program type including sports, local news, and national news programs.

10. A method to reduce query search cost, the method comprising:
    generating, in a user device, fingerprints for media content presented by a media presentation device;
    searching for the generated fingerprints in a local reference database on the media device in response to a search query requested by a client, wherein the local reference database is a subset of a remote reference database;
    searching in a local not identified cache on the media device if the generated fingerprints are not found in the local reference database; and
    responding to the client with metadata regarding the media content upon finding the generated fingerprints in the local not identified cache.

11. The method of claim 10 further comprising:
    searching the remote reference database if the generated fingerprints are not found in the local not identified cache; and
    storing the media content and the generated fingerprints in the local not identified cache upon not finding the generated fingerprints in the remote reference database, wherein subsequent searches for the media content are found in the local not identified cache without searching the remote reference database.

12. The method of claim 10 further comprising:
    searching the remote reference database if the generated fingerprints are not found in the local not identified cache; and
    storing the media content and the generated fingerprints in the local reference database upon finding the generated fingerprints in the remote reference database, wherein subsequent searches for the media content are found in the local reference database without searching the remote reference database.

13. The method of claim 12, wherein metadata including program name and program source obtained from the remote reference database are stored with the media content and the generated fingerprints in the local reference database.

14. The method of claim 10 further comprising:
    tracking the media content by finding matches to the generated fingerprints in the local reference database without querying the remote reference database.

15. The method of claim 10 further comprising:
    tracking the media content by finding matches to the generated fingerprint in the local not identified cache without querying the remote reference database.

16. The method of claim 10 further comprising:
    maintaining the local not identified cache by using a least recently used caching strategy to keep the local not identified cache under a predetermined limit.

17. The method of claim 10 further comprising:
    responding to the client, upon not finding the generated fingerprints in the local not identified cache, with a request for the client to provide the metadata regarding the media content including program name and program source for storage with the media content and the generated fingerprints in the local not identified cache.

18. The method of claim 17, wherein the metadata includes a uniform resource locator (url) for the named program.

19. A computer readable non-transitory medium encoded with computer readable program data and code, the computer readable program data and code when executed perform:
    generating, in a user device, fingerprints for media content presented by a media presentation device;
    searching for the generated fingerprints in a local reference database on the media device in response to a search query requested by a client, wherein the local reference database is a subset of a remote reference database;

searching in a local not identified cache on the media device if the generated fingerprints are not found in the local reference database; and responding to the client with metadata regarding the media content upon finding the generated fingerprints in the local not identified cache.

20. The computer readable non-transitory medium of claim 19 further comprising:

searching the remote reference database if the generated fingerprints are not found in the local not identified cache; and storing the media content and the generated fingerprints in the local not identified cache upon not finding the generated fingerprints in the remote reference database, wherein subsequent searches for the media content are found in the local not identified cache without searching the remote reference database.

21. The computer readable non-transitory medium of claim 19 further comprising:

searching the remote reference database if the generated fingerprints are not found in the local not identified cache; and storing the media content and the generated fingerprints in the local reference database upon finding the generated fingerprints in the remote reference database, wherein subsequent searches for the media content are found in the local reference database without searching the remote reference database.

\* \* \* \* \*